(12) United States Patent
Hayabuchi et al.

(10) Patent No.: US 6,712,735 B2
(45) Date of Patent: Mar. 30, 2004

(54) CONTROL APPARATUS FOR AUTOMATIC TRANSMISSION

(75) Inventors: Masahiro Hayabuchi, Anjo (JP); Masaaki Nishida, Anjo (JP); Hiroshi Tsutsui, Anjo (JP); Kouichi Kojima, Anjo (JP); Yutaka Teraoka, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/114,241

(22) Filed: Apr. 3, 2002

(65) Prior Publication Data

US 2002/0147071 A1 Oct. 10, 2002

(30) Foreign Application Priority Data

Apr. 9, 2001 (JP) ........................ 2001-110580

(51) Int. Cl.$^7$ .......................... F16H 61/40; F16H 61/26
(52) U.S. Cl. .......................... 477/68; 477/120; 477/127
(58) Field of Search .......................... 477/68, 69, 120, 477/127, 144, 116, 70, 71, 117; 475/269

(56) References Cited

U.S. PATENT DOCUMENTS

| | | | | |
|---|---|---|---|---|
| 4,819,187 A | * | 4/1989 | Yasue et al. | 701/99 |
| 4,866,624 A | * | 9/1989 | Nishikawa et al. | 701/89 |
| 5,168,776 A | | 12/1992 | Otsubo et al. | 74/858 |
| 5,460,581 A | * | 10/1995 | Ueda | 477/126 |
| 5,665,027 A | | 9/1997 | Oba et al. | 477/109 |
| 5,816,978 A | * | 10/1998 | Tabata et al. | 477/156 |
| 5,947,856 A | * | 9/1999 | Tabata et al. | 475/128 |
| 5,951,614 A | * | 9/1999 | Tabata et al. | 701/54 |
| 6,080,084 A | * | 6/2000 | Yasue et al. | 477/154 |
| 6,174,262 B1 | * | 1/2001 | Ohta et al. | 477/97 |
| 6,385,520 B1 | * | 5/2002 | Jain et al. | 701/51 |
| 6,390,949 B1 | * | 5/2002 | Kondo et al. | 477/143 |
| 6,595,895 B2 | * | 7/2003 | Suzuki et al. | 477/3 |
| 6,616,560 B2 | * | 9/2003 | Hayabuchi et al. | 475/116 |
| 6,626,786 B2 | * | 9/2003 | Hayabuchi et al. | 475/127 |

FOREIGN PATENT DOCUMENTS

| | | |
|---|---|---|
| EP | 0 567 157 A2 | 10/1993 |
| EP | 0 627 580 A2 | 12/1994 |
| JP | A 5-315898 | 11/1993 |
| JP | A 6-270444 | 9/1994 |

* cited by examiner

*Primary Examiner*—Tisha Lewis
(74) *Attorney, Agent, or Firm*—Oliff & Berridge, PLC

(57) ABSTRACT

The invention eliminates the feeling of two-phase speed-change operations by causing a speed-change operation to proceed continuously when the speed-change operation is performed through two-phase control of engagement and release of four engagement elements. An automatic transmission is such that a predetermined speed-change operation is achieved through a pre-phase speed-change operation in which a first engagement element and a third engagement element are released and engaged respectively and through a post-phase speed-change operation in which a second engagement element and a fourth engagement element are released and engaged respectively. A control apparatus has a torque control capability for adjusting an input torque of a transmission during the pre-phase speed-change control, and ensures continuous changes in the input speed during the pre-phase and post-phase speed-change operations through adjustment of the input torque (torque reduction) to prevent bluntness from being caused between the pre-phase and post-phase speed-change operations.

16 Claims, 19 Drawing Sheets

|   | C-1 | C-2 | C-3 | B-1 | B-2 | B-3 | F-1 | F-2 |
|---|---|---|---|---|---|---|---|---|
| P |   |   |   |   |   |   |   |   |
| R |   |   | ○ |   |   | ○ |   |   |
| N |   |   |   |   |   |   |   |   |
| 1st | ○ |   |   |   |   | △ |   | ○ |
| 2nd | ○ |   |   | △ | ○ |   | ○ |   |
| 3rd | ○ |   | ○ |   | ● |   |   |   |
| 4th | ○ | ○ |   |   | ● |   |   |   |
| 5th |   | ○ | ○ |   | ● |   |   |   |
| 6th |   | ○ |   | ○ | ● |   |   |   |

GainA

|  | Nout1 | Nout2 | Nout3 | Nout4 | Nout5 |
|---|---|---|---|---|---|
| NORMAL DOWNSHIFT | A | B | C | D | E |
| DURING 6-3 SPEED-CHANGE OPERATION | A' | B' | C' | D' | E' |

SET ACCORDING TO OUTPUT SPEED Nout  □>□'

Fig. 12

GainB

|  | Tq_1 | Tq_2 | Tq_3 | Tq_4 | Tq_5 |
|---|---|---|---|---|---|
| NORMAL DOWNSHIFT | F | G | H | I | J |
| DURING 6-3 SPEED-CHANGE OPERATION | F' | G' | H' | I' | J' |

SET ACCORDING TO INPUT TORQUE Tq  □>□'

Fig. 13

CONTROL APPARATUS FOR AUTOMATIC TRANSMISSION

INCORPORATION BY REFERENCE

The disclosure of Japanese Patent Application No. 2001-110580 filed on Apr. 9, 2001 including the specification, drawings and abstract is incorporated herein by reference in its entirety.

BACKGROUND OF THE INVENTION

1. Field of Invention

The invention relates to a control apparatus for an automatic transmission, and more particularly to an art for smoothly performing a speed-change operation requiring phasic changeover of the engagement and release of engagement elements between speed-change stages.

2. Description of Related Art

As is well known, an automatic transmission is designed to change over power-transmission paths extending through speed-change elements composed of planetary gears by engaging or releasing frictional engagement elements and to establish a plurality of speed-change stages by changing a gear ratio. For the purpose of performing the engagement and release of the engagement elements during a speed-change operation through the simplest hydraulic-pressure control while inhibiting generation of a speed-change shock, operations of the engagement elements for upshift or downshift are generally performed as follows. That is, basically, for a plurality of engagement elements or a single engagement element which are or is engaged to establish a certain speed-change stage, another one of the engagement elements is engaged additionally, or one engagement element that is engaged is released. A so-called changeover operation of the engagement elements is performed if it is inevitable for reasons of the structure of a gear train. That is, while the engagement elements that are engaged are released, the other engagement elements are engaged.

In recent years, automatic transmissions have developed a tendency to adopt a multiple-stage structure in response to a demand for an improvement in driveability and energy conservation based on a reduction in the amount of fuel consumed. The tendency to adopt a multiple-stage structure in automatic transmissions is realized, in general, by adding a speed-increasing or speed-reducing stage based on an overdrive or underdrive gear to a speed-change mechanism composed of a multiple-stage planetary gear set. As an alternative, however, there is also, as disclosed in Japanese Patent Application No. 4-219553, a multiple-stage structure achieved by two systems, namely, high and low systems for inputting power to a planetary gear set of Ravigneaux type.

In the aforementioned gear train having a multiple-stage structure, the possibilities of selecting speed-change stages suited for a running condition of the vehicle are widened. Therefore, the changeover operation of engagement elements is not limited to a simple changeover of two elements but may be a complicated changeover of four elements if necessary. A so-called skip speed-change operation for shifting to a specific one of a multitude of speed-change stages at a stretch is an example requiring such a changeover of four elements. Especially in performing multiple changeover, as represented by such changeover of four elements, if the engagement elements are engaged or released all at once, it is difficult to grasp the behavior of the elements in the speed-change mechanism individually. As a result, it becomes substantially impossible to perform control. Hence, a multiple changeover speed-change operation requires control for engaging or releasing the engagement elements in a certain order, whereby it becomes a requirement to perform speed-change operations in a phasic manner.

Because the engagement elements are engaged or released in a certain order, the following problems result. That is, phasic occurrence of a shock is likely during a multiple changeover speed-change operation, and the interval between speed-change operations tends to increase. The phasic occurrence of a shock during a speed-change operation or an increase in the interval between speed-change operations causes an undesirable feeling of incongruity to a driver. Timings for engaging or releasing the engagement elements are crucial in solving such problems. However, for reasons of manufacturing variations among individual automatic transmissions or operational states of the vehicle, it is difficult to perfectly match the timings for engaging or releasing the engagement elements.

SUMMARY OF THE INVENTION

It is thus an objective of the invention to provide a speed-change control apparatus for an automatic transmission capable of preventing an increase in the interval between speed-change operations while eliminating phasic occurrence of a shock during a multiple changeover speed-change operation.

BRIEF DESCRIPTION OF THE DRAWINGS

The invention will be described with reference to the drawings, in which:

FIG. 12 is a chart showing how to set a gain corresponding to an inertia for calculating a torque-down amount during torque-reduction control;

FIG. 13 is a chart showing how to set a gain corresponding to an engine torque for calculating a torque-down amount during torque-reduction control;

DETAILED DESCRIPTION OF PREFERRED EMBODIMENTS

Figure 1:
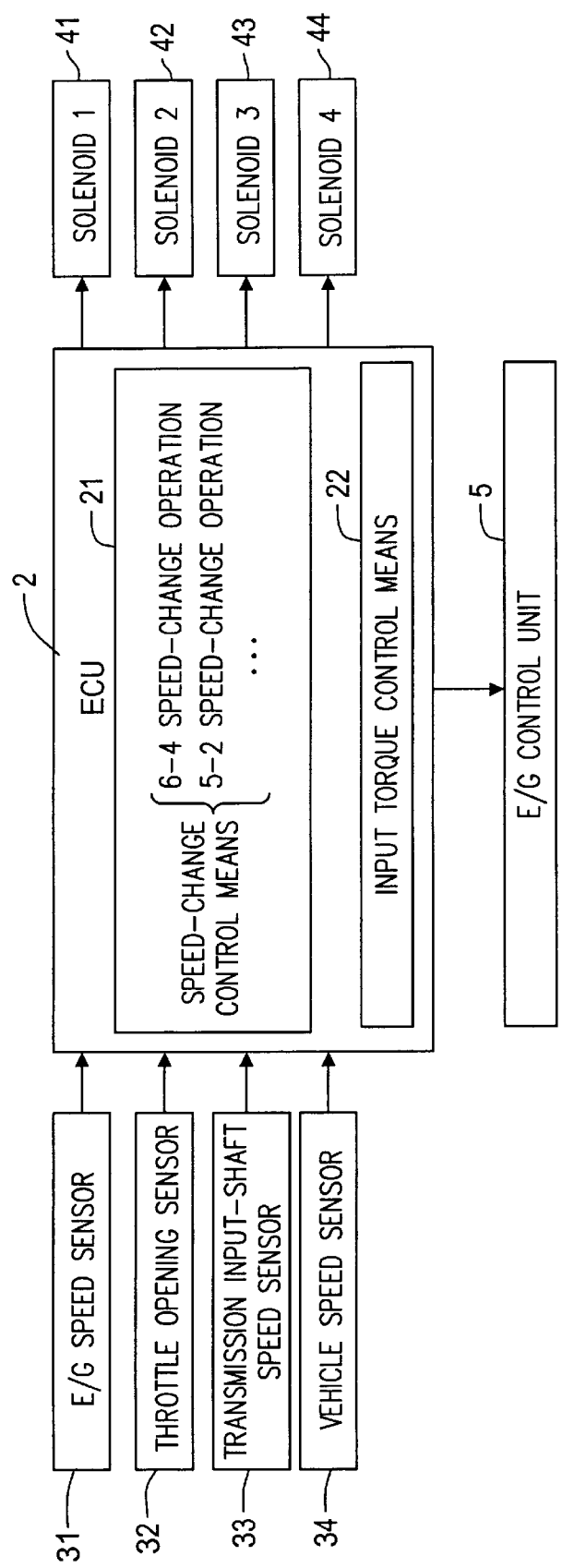
FIG. 1 is a block diagram showing the structure of a signal system of a control apparatus for an automatic transmission according to a first embodiment of the invention.

Embodiments of the invention will now be described with reference to the drawings. FIGS. 1 to 15 show a first embodiment of an automatic transmission to which a control apparatus according to the invention is applied. FIG. 1 is a block diagram of a configuration of a signal system of the control apparatus. As shown in FIG. 1, the control apparatus has a speed-change control means 21 in an electronic control unit (ECU) 2, which is a central component member of the control apparatus. The control apparatus has various sensors as an input means for inputting various pieces of information to the ECU 2, namely, an engine (E/G) speed sensor 31 for detecting the engine speed of a vehicle, a throttle opening sensor 32 for detecting an engine load, a transmission input-shaft speed sensor 33 for detecting an input speed of a transmission, and a vehicle speed sensor 34 for detecting a vehicle speed from a speed of an output shaft of the transmission. The control apparatus has a plurality of solenoids as an output means operating by the output of a drive signal based on control information, namely, solenoids 1 to 4 as actuators for solenoid valves 41 to 44 disposed in a hydraulic control unit, which will be described later in detail with reference to FIG. 5. The control apparatus also has an input torque control means 22 as an output means for outputting a signal for adjusting a throttle opening to an engine electronic control unit 5.

Figure 2:
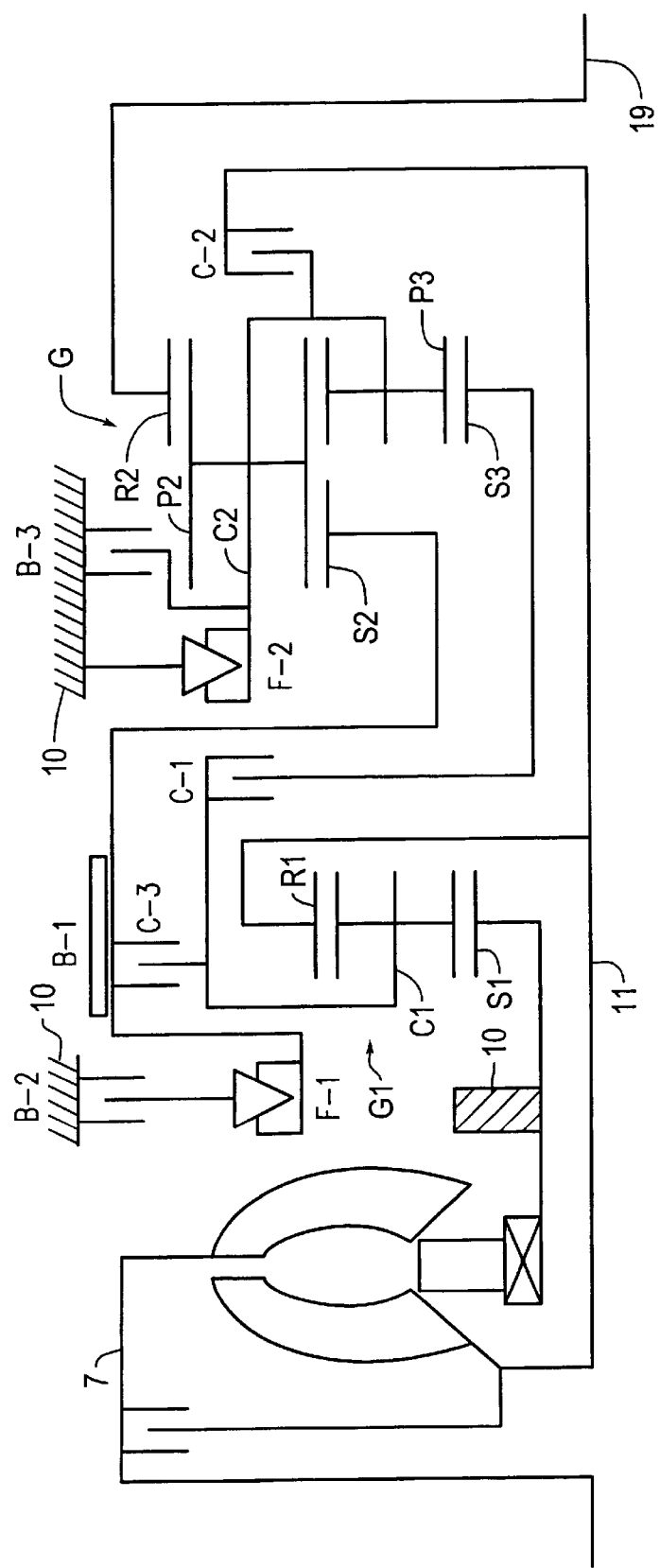
FIG. 2 is a schematic diagram of a gear train of the automatic transmission.

FIG. 2 is a schematic diagram showing a six-speed gear train for front engine rear wheel drive (FR) vehicles as an example of a speed-change mechanism controlled by the aforementioned control apparatus. The gear train comprises a torque converter 7 and a speed-change mechanism. The torque converter 7 is equipped with a lock-up clutch. The speed-change mechanism has six forward stages and one backward stage and is composed of a planetary gear set G of Ravigneaux type and a deceleration gear G1 of simple planetary type.

The planetary gear set G, which is a main component member of the speed-change mechanism, comprises a gear set of Ravigneaux type. The gear set is composed of sun gears S2, S3 having different diameters, a ring gear R2, a long pinion gear P2 that meshes with the sun gear S2 with the larger diameter in a circumscribed manner and that meshes with the ring gear R2 in an inscribed manner, a short pinion gear P3 that meshes with the sun gear S3 with the smaller diameter in a circumscribed manner and that also meshes with the long pinion gear P2 in a circumscribed manner, and a carrier C2 supporting both the pinion gears P2, P3. The small-diameter sun gear S3 of the planetary gear set G is coupled to a multiple-disc clutch C-1. Hereafter, each engagement element is marked with a symbol, which precedes the name of the element.

The large-diameter sun gear S2 is coupled to a multi-disc C-3 clutch and can be hooked to an automatic transmission case 10 by a B-1 brake which is a band brake. Furthermore, the large-diameter sun gear S2 can be hooked to the automatic transmission case 10 by a multiple-disc B-2 brake and an F-1 one-way clutch, which are disposed in parallel with the B-1 brake. The carrier C2 is coupled to an input shaft 11 via a C-2 clutch as a multiple-disc engagement element, and can be hooked to the transmission case 10 by a multiple-disc B-3 brake. Also, the carrier C2 can be hooked to the transmission case 10 by an F-2 one-way clutch in such a manner as to rotate in one direction. The ring gear R2 is coupled to an output shaft 19.

The deceleration planetary gear G1 is a simple planetary gear. A ring gear R1, as an input element of the deceleration planetary gear G1, is coupled to the input shaft 11. A carrier C1 as an output element of the deceleration planetary gear G1 is coupled to the small-diameter sun gear S3 via the C-1 clutch and to the large-diameter sun gear S2 via the C-3 clutch. A sun gear S1, as a stationary element for gaining a counterforce, is fixed to the transmission case 10.

Figures 3, 4:
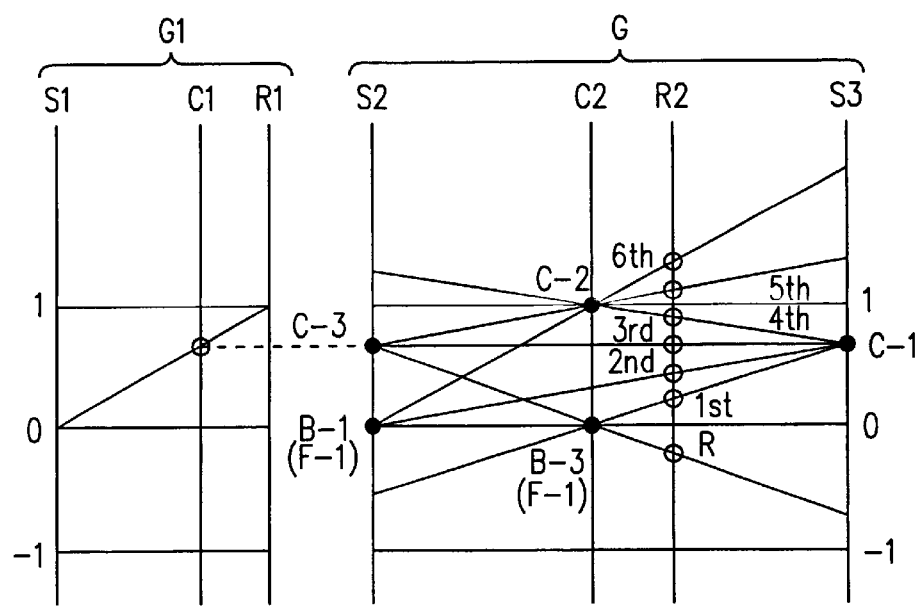
FIG. 3 is an engagement chart showing the relationship between engagement and release of engagement elements on one hand and speed-change stages achieved by the gear train on the other hand.
FIG. 4 is a speed diagram of the gear train.

FIG. 3 is an engagement chart showing how the speed-change stages to be established are related to engagement and release of the engagement elements of the automatic transmission, that is, the clutches, the brakes, and the one-way clutches. In the engagement chart, the blanks filled in with O, the unfilled blanks, the blanks filled in with Δ, and the blanks filled in with • represent engagement, release, engagement for engine braking, and engagement that does not directly affect establishment of a speed-change stage, respectively. FIG. 4 is a speed diagram showing how speed-change stages established through engagement of each of the clutches, brakes, and one-way clutches, engagement is denoted by •, are related to speed ratios among the speed-change elements.

As is apparent by referring to FIGS. 3 and 4, a first-speed (1st) stage is established through engagement of the C-1 clutch and the B-3 brake. However, in practice automatic engagement of the F-2 one-way clutch is adopted instead of engagement of the B-3 brake as is apparent by referring to an operational chart in this embodiment. Engagement of the F-2 one-way clutch is adopted as the equivalent of engagement of the B-3 brake because the F-1 one-way clutch for automatically releasing an engaging force upon engagement of the B-1 brake is used to avoid complication of hydraulic pressure control for changeover between the B-3 brake and the B-1 brake during a 1-2 speed-change operation that will be described later and to simplify release control of the B-3 brake. In this case, rotation that has been transmitted from the input shaft 11 via the deceleration planetary gear G1 while being decelerated is input to the small-diameter sun gear S3 via the C-1 clutch, gains a counterforce from the carrier C2 that has been locked through engagement of the F-2 one-way clutch, and is output to the output shaft 19 as decelerated rotation of the ring gear R2 at a maximum deceleration ratio.

A second-speed (2nd) stage is then established through engagement of the C-1 clutch and engagement of the B-2 brake, which makes engagement of the F-1 one-way clutch effective. Engagement of the F-1 one-way clutch and the B-2 brake is equivalent to engagement of the B-1 brake. It will be described later in detail why engagement of the F-1 one-way clutch and the B-2 brake is equivalent to engagement of the B-1 brake. In this case, rotation, that has been transmitted from the input shaft 11 via the deceleration planetary gear G1 while being decelerated is input to the small-diameter sun gear S3 via the C-1 clutch, gains a counterforce from the large-diameter sun gear S2 that has been locked through engagement of the B-2 brake and the F-1 one-way clutch, and is output to the output shaft 19 as decelerated rotation of the ring gear R2. As is apparent from FIG. 4, the deceleration ratio at this moment is smaller than the deceleration ratio in the case of the first-speed (1st) stage.

A third-speed (3rd) stage is established through the simultaneous engagement of the C-1 clutch and the C-3 clutch. In this case, rotation that has been transmitted from the input shaft 11 via the deceleration planetary gear G1 while being decelerated is simultaneously input to the large-diameter sun gear S2 and the small-diameter sun gear S3 via the C-1 clutch and the C-3 clutch respectively, so that the planetary gear set assumes a direct-coupled state. Therefore, rotation of the ring gear R2, which is the same as rotation that has been input to both the sun gears, is output to the output shaft 19 as rotation that has been decelerated with respect to rotation of the input shaft 11.

A fourth-speed (4th) stage is established through the simultaneous engagement of the C-1 clutch and the C-2 clutch. In this case, while rotation that has been transmitted from the input shaft 11 via the deceleration planetary gear G1 while being decelerated is input to the small-diameter sun gear S3 via the C-1 clutch, non-decelerated rotation that has been input from the input shaft 11 via the C-2 clutch is input to the carrier C2. Intermediate rotation between the two input rotations is output to the output shaft 19 as a rotation of the ring gear R2, which has been slightly decelerated with respect to rotation of the input shaft 11.

A fifth-speed (5th) stage is established through the simultaneous engagement of the C-2 clutch and the C-3 clutch. In this case, rotation that has been transmitted from the input shaft 11 via the deceleration planetary gear G1 while being decelerated is input to the large-diameter sun gear S2 via the C-3 clutch, non-decelerated rotation that has been input from the input shaft 11 via the C-2 clutch is input to the carrier C2. Rotation of the ring gear R2, which has been slightly accelerated with respect to rotation of the input shaft 11, is output to the output shaft 19.

A sixth-speed (6th) stage is established through engagement of the C-2 clutch and the B-1 brake. In this case, non-decelerated rotation is input only to the carrier C2 from the input shaft 11 via the C-2 clutch, gains a counterforce from the sun gear S2 that has been locked through engagement of the B-1 brake, and is output to the output shaft 19 as a further accelerated rotation of the ring gear R2.

A reverse (R) stage is established through engagement of the C-3 clutch and the B-3 brake. In this case, rotation that has been transmitted from the input shaft 11 via the deceleration planetary gear G1 while being decelerated is input to the large-diameter sun gear S2 via the C-3 clutch, gains a counterforce from the carrier C2 that has been locked through engagement of the B-3 brake, and is output to the output shaft 19 as reverse rotation of the ring gear R2.

It will now be described, though alluded to in the foregoing description, how the F-1 one-way clutch is related to the B-1 brake and the B-2 brake. In this case, the F-1 one-way clutch, coupled to the sun gear S2, is engaged in such a direction as to support a counter torque of the large-diameter sun gear S2 at the second-speed stage, whereby the F-1 one-way clutch can substantially perform the same function as engagement of the B-1 brake. However, because the large-diameter sun gear S2 is different from the carrier C2 and is a speed-change element that not only is engaged to achieve the effect of engine braking at the second-speed stage but also is locked to establish the sixth-speed stage, the B-1 brake is required. As is also apparent from the speed diagram shown in FIG. 4, the large-diameter sun gear S2 rotates reversely with respect to a direction of input rotation upon establishment of the first-speed (1st) stage, but rotates in the direction of input rotation at the third-speed stage or any higher speed stage. Accordingly, the F-1 one-way clutch cannot be directly coupled to a stationary member and thus is disposed in series with the B-2 brake so as to make it possible to control the effectiveness of an engaged state.

As is qualitatively apparent by referring to vertical distances among the marks O indicating speed ratios of the ring gear R2 in the speed diagram shown in FIG. 4, each speed-change stage established as described above is relatively equidistant from its adjacent speed-change stages, so that good speed steps are obtained. The gear train does not require multiple changeover of the engagement elements during a normal upshift or downshift operation between two adjacent speed-change stages but requires such during a skip speed-change operation. Such a skip speed-change operation is necessary especially during a downshift operation such as a 6-3 or 5-2 speed-change operation. During such a speed-change operation, the B-2 brake is always engaged at the second-speed stage or any higher speed stage in order to simplify control. Therefore, automatic engagement of the F-1 one-way clutch plays the same role as engagement of the B-1 brake.

Figure 5:
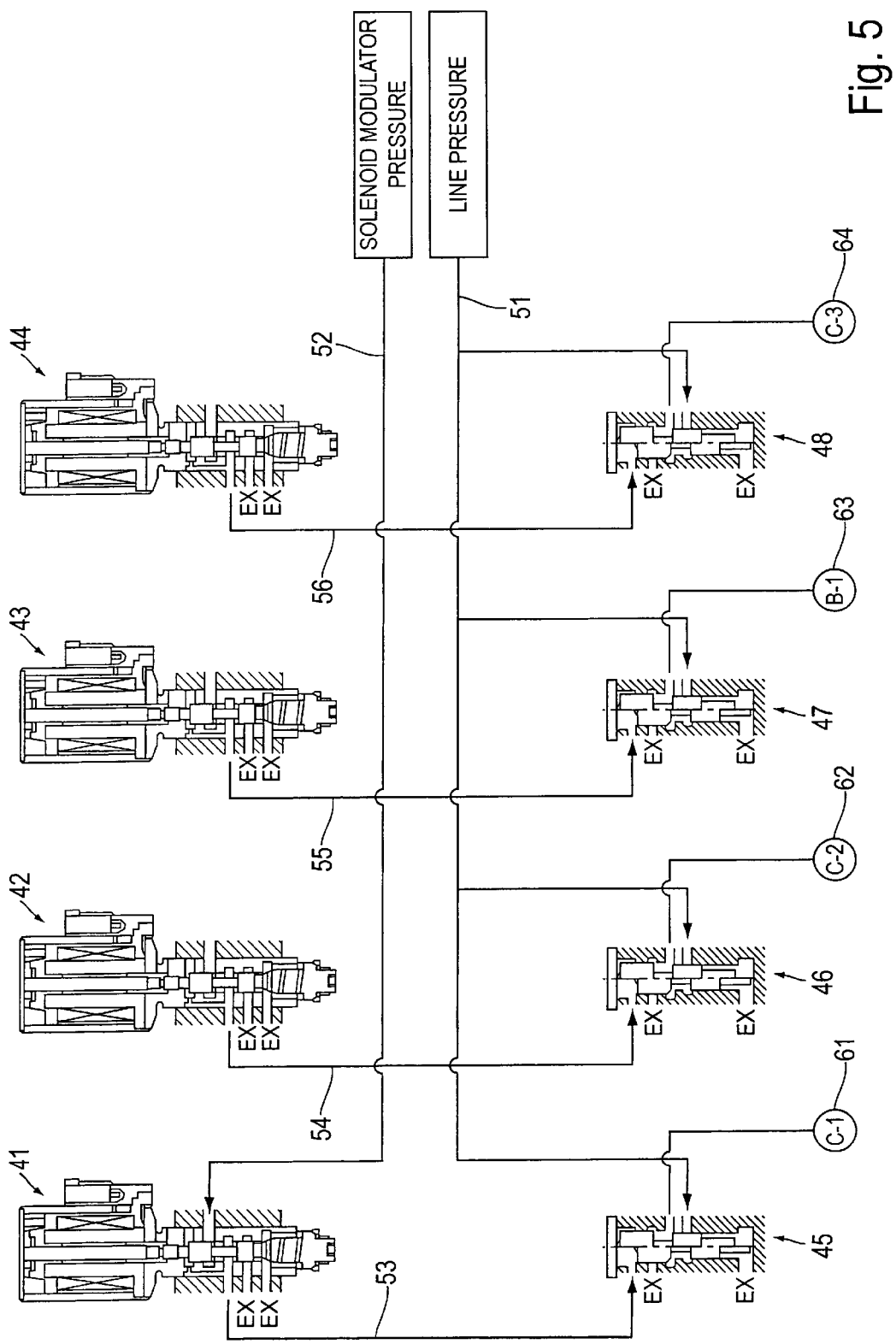
FIG. 5 is a hydraulic circuit diagram of an operational system of the control apparatus.

The hydraulic control unit for controlling the speed-change mechanism thus structured, by operating hydraulic servos for the aforementioned clutches and brakes, is designed such that each of the hydraulic servos for a corresponding one of the engagement elements is controlled directly and independently by a proper solenoid valve on the basis of a solenoid drive signal from the electronic control unit 2 so as to make the aforementioned skip speed-change operation easy to perform. As is apparent from the circuit structure shown in FIG. 5, the hydraulic circuit is structured as follows. That is, control valves 45 to 48 are connected in parallel with one another with respect to a line-pressure hydraulic passage 51, which is connected to a circuit for supplying a line pressure, a maximum pressure capable of maintaining the engagement elements in an engaged state in accordance with a running load of the vehicle. FIG. 5 indicates the circuit as a block instead of showing its specific structure. Each of the control valves 45 to 48 operates to regulate pressure in accordance with a solenoid pressure applied from a corresponding one of solenoid valves 41 to 44.

A hydraulic servo 61 for the C-1 clutch is connected to the line-pressure hydraulic passage 51 via the C-1 control valve 45, which is connected at its spool end to a hydraulic passage 52 for a solenoid modulator pressure, via a solenoid pressure hydraulic passage 53 and a solenoid valve 41. The solenoid modulator pressure is obtained by reducing a line pressure via a modulator valve so as to increase a gain of pressure regulation by a solenoid valve.

The C-1 control valve 45 is designed as a spool valve having lands at its opposed ends, and the lands are different in diameter. The C-1 control valve 45 is structured such that a solenoid signal pressure is applied to the large-diameter land end against a spring load applied to the small-diameter land end, that the large-diameter land thereby closes a drain port, that the line-pressure hydraulic passage 51 and the hydraulic servo 61 thereby communicate with each other while the small-diameter land narrows a gap between an inlet port leading to the line-pressure hydraulic passage 51 and an outlet port leading to the hydraulic servo 61, that the small-diameter land closes the inlet port and the large-diameter land opens the drain port as soon as a solenoid pressure is released, and that the hydraulic servo 61 is connected in a drainable manner as a result.

On the other hand, the solenoid valve 41 is designed as a normal-open linear solenoid valve. Similarly, the solenoid valve 41 is structured such that a gap between the solenoid-modulator-pressure hydraulic passage 52 and a solenoid-pressure hydraulic passage 53 is adjusted by a load applied to a plunger against a spring load applied to one end of a spool having lands at its opposed ends and a solenoid pressure is regulated by adjusting an amount of drainage through the solenoid-pressure hydraulic passage 53. The C-2 clutch, the B-1 brake, and the C-3 clutch also adopt a parallel circuit structure that is quite similarly composed of the control valves 46, 47, 48, the solenoid valves 42, 43, 44, and the solenoid-pressure hydraulic passages 54, 55, 56, respectively. The solenoid-pressure hydraulic passages 54, 55, 56 connect the control valves 46, 47, 48 to the solenoid valves 42, 43, 44, respectively.

The automatic transmission thus structured requires operation of four engagement elements, the C-1 clutch, the C-2 clutch, the C-3 clutch, and the B-1 brake, for example, during a 6-3 speed-change operation wherein the first speed-change stage is the sixth-speed stage and wherein the second speed-change stage is the third-speed stage that is separated from the sixth-speed stage by three stages. In this case, the first speed-change stage, i.e., the sixth-speed stage, is established through engagement of the first and second engagement elements, the B-1 brake and the C-2 brake, respectively, and the second speed-change stage, i.e., the third-speed stage, is established through engagement of the third and fourth engagement elements, the C-1 clutch and the C-3 clutch, respectively. In the case where the first speed-change stage is the fifth-speed stage, operation of four engagement elements, the C-1 clutch, the C-2 clutch, the C-3 clutch, and the F-1 one-way clutch, is also required during a speed-change operation from the fifth-speed stage to the second-speed stage that is separated from the fifth-speed stage by three stages. In this case, the first, second, third, and fourth engagement elements are the C-2 clutch, the C-3 clutch, the C-1 clutch, and the F-1 one-way clutch, respectively. Thus, according to the invention, in preparation for such a speed-change operation, the speed-change control unit is provided with the speed-change control means 21 (see FIG. 1) for starting to release the second engagement element, the C-2 clutch or the C-3 clutch, after commencement of release of the first engagement element, the B-1 brake or the C-1 clutch, completing engagement of the fourth engagement element, the C-3 clutch or the F-1 one-way clutch after completion of engagement of the third engagement element, the C-1 clutch, and starting to release the second engagement element, the C-2 clutch or the C-3 clutch prior to completion of engagement of the third engagement element, the C-1 clutch.

It is to be noted herein that engagement or release of the engagement elements includes a transient slip state leading to complete engagement or complete release. Accordingly, starting to release a certain engagement element means starting to cause it to slip. With an engagement element that is operated hydraulically, starting to release it means starting to cause it to slip through a decrease in engaging force. In the case of a one-way clutch that is not operated hydraulically, starting to release it means making it free in accordance with a change in rotational direction of a rotational member. Similarly, completing engagement of a certain engagement element means causing it to stop slipping. Accordingly, with respect to an engagement element that is operated hydraulically, completing its engagement means causing it to stop slipping through an increase in engaging force, and with a one-way clutch that is not operated hydraulically, completing its engagement means locking it in accordance with a change in rotational direction of a rotational member.

In this embodiment, the speed-change control means 21 is designed such that the first speed-change stage, the sixth-speed stage or the fifth-speed stage, is established through operation of two, the C-1 clutch and the B-1 brake of the aforementioned four engagement elements; the second speed-change stage, the third-speed stage or the second-speed stage, is established through operation of the other two engagement elements, that a third speed-change stage, a fourth-speed stage or the third-speed stage, is set, and that a speed-change operation from the first speed-change stage, the sixth-speed stage or the fifth-speed stage, to the second speed-change stage, the third-speed stage or the second-speed stage, is shifted to a speed-change operation from the third speed-change stage, the fourth-speed stage or the third-speed stage, to the second speed-change stage, the third-speed stage or the second-speed stage, via a speed-change operation from the first speed-change stage, the sixth-speed stage or the fifth-speed stage, to the third speed-change stage, the fourth-speed stage or the third-speed stage. In this case, the four engagement elements are the C-1 clutch that is engaged during a speed-change operation to the third speed-change stage, the fourth-speed stage or the third-speed stage, the B-1 brake or the C-2 clutch that is released during the speed-change operation, the C-3 clutch or the F-1 one-way clutch that is engaged during a speed-change operation to the second speed-change stage, the third-speed stage or the second-speed stage, and the C-2 clutch or the C-3 clutch that is released during the speed-change operation.

The structure of the speed-change control means 21 will now be described referring to the case of a 6-3 speed-change operation, as an example. The speed-change control means 21 of this embodiment comprises a program in the control unit. The speed-change operation is performed by controlling the hydraulic servos 61 to 64 for the engagement elements through operation of the solenoid valves 41 to 44, based on a solenoid drive signal output on the basis of the program. Hereinafter, control flowcharts of the speed-change control means 21 for the engagement elements will be described one by one.

Figure 6:
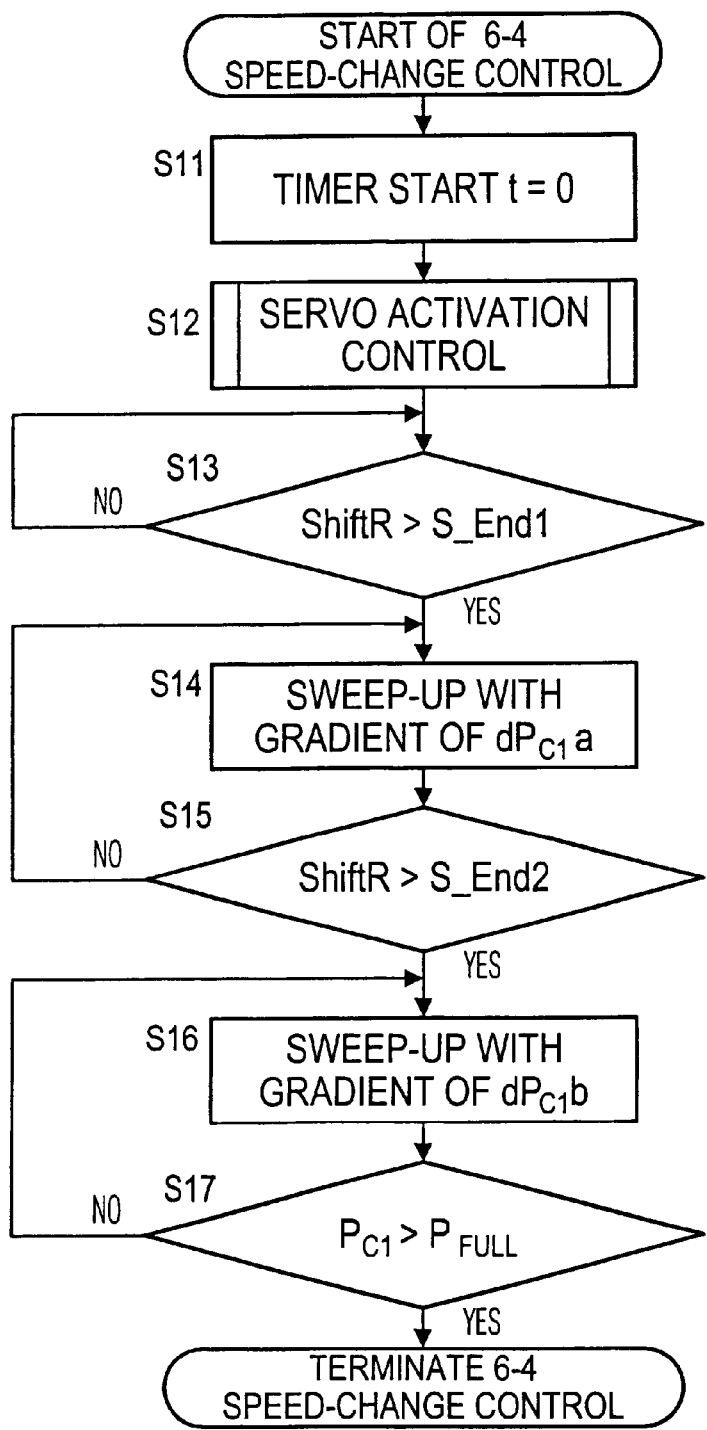
FIG. 6 is a flowchart of engagement control of a C-1 clutch during a 6-4 speed-change as part of a 6-3 speed-change operation.

First of all, a control flowchart for engaging the C-1 clutch or the third engagement element is shown in FIG. 6.

In performing this control, a timer is started first in step S11 (start timer t=0). A sub-routine processing for servo activation control is then performed in step S12. This processing is designed to maintain a fast fill of a hydraulic pressure for filling a hydraulic servo cylinder for the C-1 clutch and a subsequent piston stroke pressure for narrowing a gap between a hydraulic servo piston and a frictional member of the engagement element. This processing is a known processing that is usually performed to engage a clutch. A determination of the degree of completion (Shift R>S_End 1) is made in step S13 on the basis of an indicator (Shift R) for making a determination on a proceeding degree of the speed-change operation. This proceeding degree of the speed-change operation can also be determined using the speed of the input shaft or the hydraulic pressure of the hydraulic servo as an indicator of the determination. In this embodiment, however, the proceeding degree of the speed-change operation is expressed by the equation shown below, using speeds of the input shaft and the output shaft as indicators.

Shift R=(speed of input shaft of transmission−pre-speed-change gear ratio×speed of output shaft of transmission)×100/speed of output shaft of transmission×(postspeed-change gear ratio−pre-speed-change gear ratio)[%]

For instance, the proceeding degree is set as 70% and calculated on the basis of values detected by the transmission input-shaft speed sensor 33 and the vehicle speed sensor 34. Because the result of this determination is negative (No) at the outset, the processing for the determination is continued until the proceeding of the speed-change operation is completed. As soon as the result of the aforementioned determination becomes positive (Yes), a pressure-increasing operation for starting engagement of the C-1 clutch (sweep-up with a gradient of $dP_{C1}a$) is started in step S14. Specifically, this processing is designed to control an electric current value of a drive signal transmitted to a solenoid 1 and to operate the solenoid valve 41, shown in FIG. 5, for pressure regulation so that the solenoid pressure thus obtained increases the hydraulic pressure of the hydraulic servo with the gradient of $dP_{c1}a$ through the control valve 45. This relationship between the drive signal and the servo pressure is maintained in all the hydraulic control operations that will be described below.

In step S15, while the pressure-increasing operation is continued, it is determined on the basis of the indicator (Shift R) for the proceeding degree of the speed-change operation whether the speed-change operation has reached a state before synchronization with the fourth-speed stage (Shift R>S_End 2), for example, 90%. Because the result of this determination is also negative at the outset, the sweep-up operation is continued through repetition of a loop for returning to step S14 until the process of the speed-change operation is completed. When the result of the determination in step S15 becomes positive, a process of increasing the servo hydraulic pressure to a line pressure, sweep-up with a gradient of $dP_{C1}b$, is performed in step S16 so as to reliably maintain engagement of the C-1 clutch. A process of determining whether the servo hydraulic pressure has reached the line pressure ($P_{C1}>P_{FULL}$) is then repeated in step S17. As soon as the result of the determination in step S17 becomes positive, the 6-4 speed-change control for engagement control of the C-1 clutch is terminated.

Figure 7:
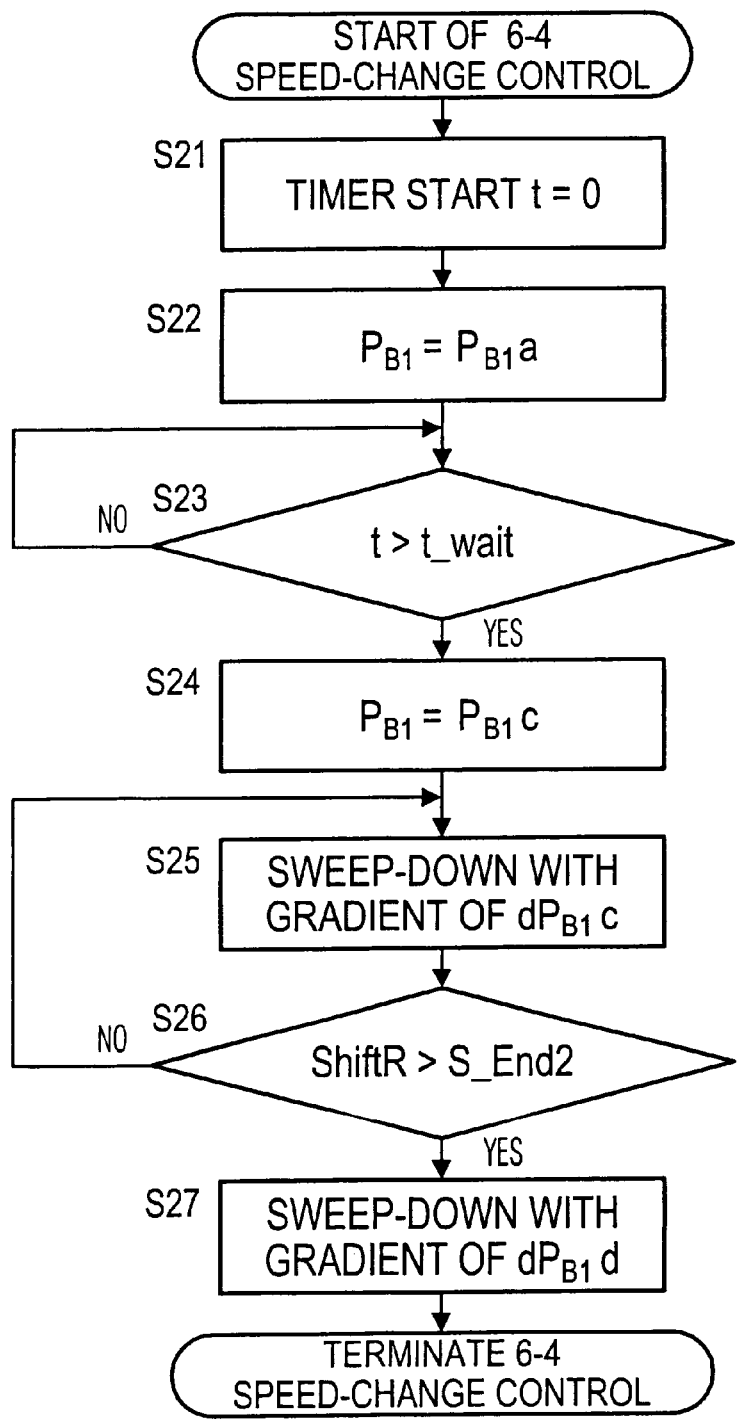
FIG. 7 is a flowchart of release control of a B-1 brake during the 6-4 speed change as part of the 6-3 speed-change operation.

A control flowchart for releasing the B-1 brake or the first engagement element is shown in FIG. 7. This control is started simultaneously with the aforementioned 6-4 speed-change control for engaging the C-1 clutch. As in the case of the aforementioned control, the timer is started in step S21 (start timer t=0). A process of temporarily maintaining the servo hydraulic pressure at a predetermined pressure slightly lower than an engaging pressure ($P_{B1}=P_{B1}a$) is then performed in step S22. The process is intended to prevent the engine from undergoing prefiring due to operational dispersion in the C-1 clutch resulting from aging or a difference among individual transmissions. A period for maintaining this predetermined pressure is then monitored in step S23. The processing is continued until the result of the determination (timer t>t_wait) in step S23 becomes positive. After the timer has measured the lapse of a certain period, a process of starting to release the B-1 brake is performed in step S24 so as to rapidly reduce the servo hydraulic pressure to a predetermined pressure ($P_{B1}=P_{B1}c$). A process of gradually reducing the servo hydraulic pressure (sweep-down with a gradient of $dP_{B1}c$) is then performed in step S25. Furthermore, a determination on a degree of completion (Shift R) of the speed-change operation is then made in step S26. In this case as well, because the result of the determination in step S26 is negative at the outset, the speed-change operation is repeated through a loop for returning to step S25. If the result of the determination on the degree of completion of the speed-change operation in step S26 becomes positive (Shift R>S_End 2), a low-pressure process of completely removing the servo hydraulic pressure of the B-1 brake (sweep-down with a gradient of $dP_{B1}d$) is then performed in step S27. This process is completed automatically as soon as a solenoid valve 3 reaches a full output. Therefore, the 6-4 speed-change control for releasing the B-1 brake is terminated without performing any further monitoring or determining operation.

Figure 8:
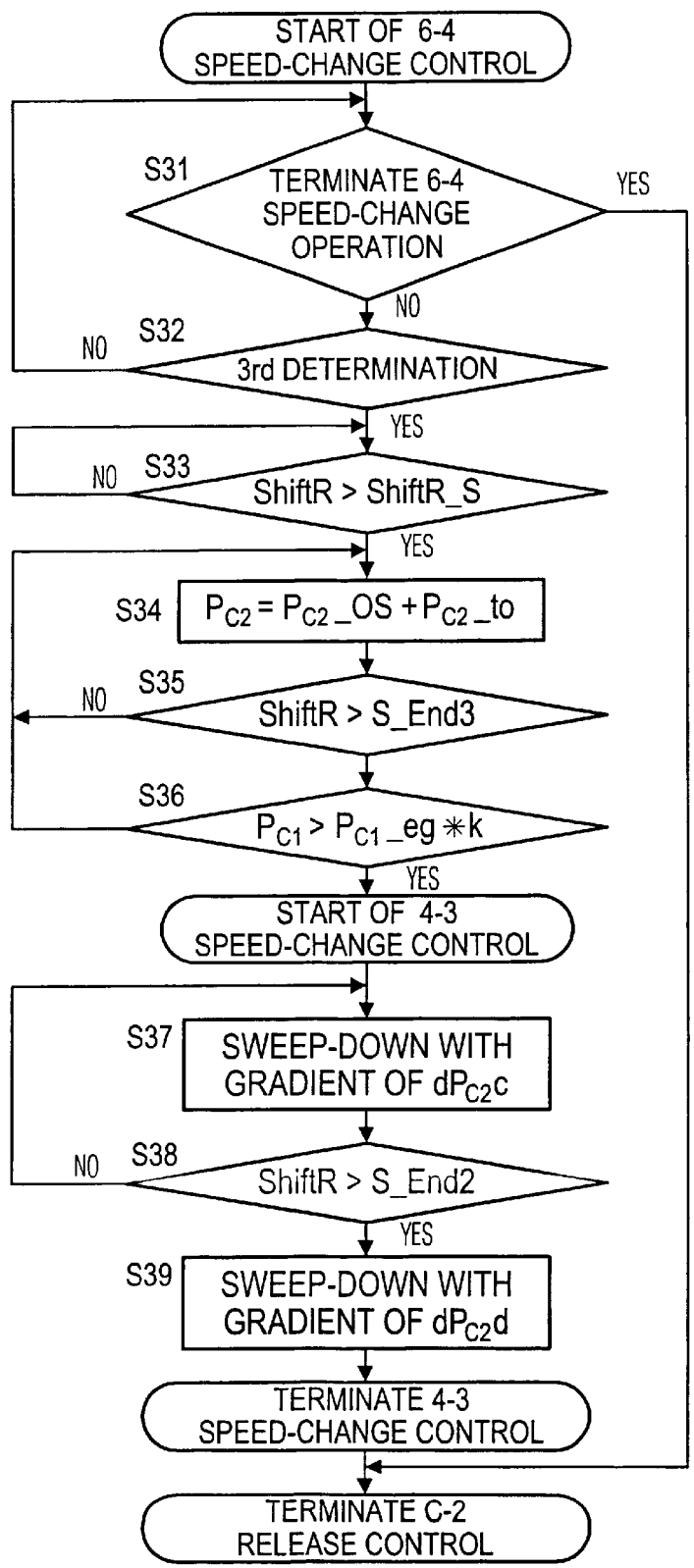
FIG. 8 is a flowchart of release control of a C-2 clutch during the 6-3 speed-change operation.
Figure 9:
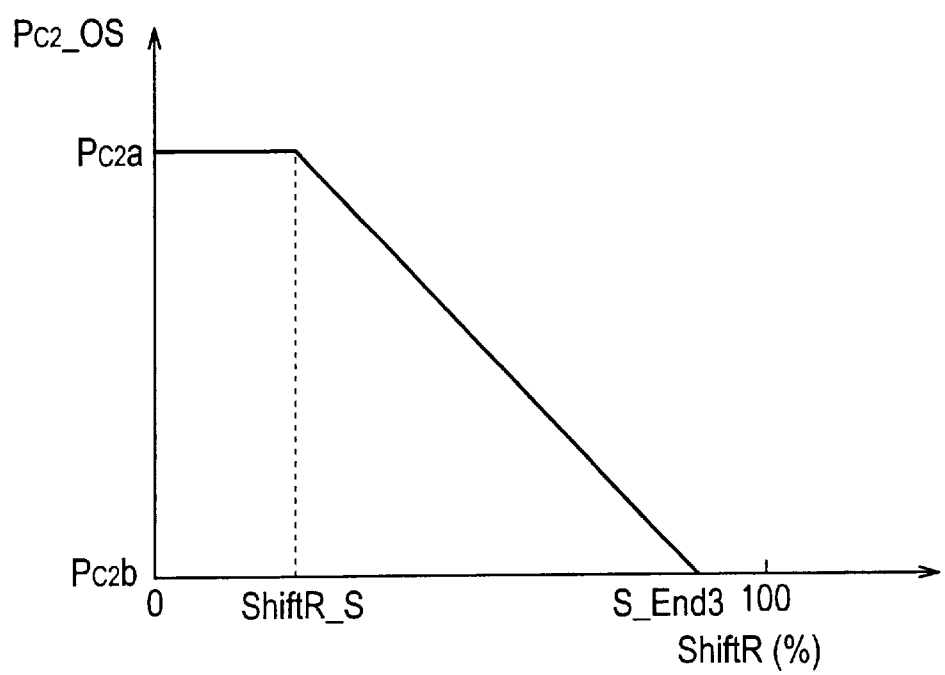
FIG. 9 is a hydraulic-pressure characteristic diagram showing a method of setting a safety factor for a hydraulic pressure for releasing the C-2 clutch.

A control flowchart for releasing the C-2 clutch or the second engagement element is shown in FIG. 8. As a premise in this process, the C-2 release control is inappropriate if the 6-4 speed-change operation has already been terminated. To exclude this case, it is determined first in step S31 whether the 6-4 speed-change operation has been terminated. If the result of the determination in step S31 is positive, subsequent processings are skipped to terminate the C-2 release control. When the aforementioned case is excluded, it is then determined in step S32 whether a shift command to the third-speed stage is fulfilled (3rd determination). Thus, a shift operation to the third-speed stage is distinguished from the other speed-change stages. After it has thus been confirmed that performance of the present control is appropriate, a determination on a proceeding degree (Shift R) of the speed-change operation is started, in step S33, so as to determine a timing for starting to release the C-2 clutch.

An indicator for making a determination on a degree of completion of the speed-change operation in this case is a value (Shift R_S) that is based on a speed of the input shaft of the transmission. As soon as the result of the determination in step S33 becomes positive (Shift R>Shift R_S), a low-pressure process of rapidly reducing the servo hydraulic pressure of the C-2 clutch to a predetermined hydraulic pressure ($P_{C2}=P_{C2\_}OS+P_{C2\_}to$) is performed in step S34. The predetermined pressure in this case is the sum of a hydraulic pressure ($P_{C2\_}to$) suited for a torque input to the C-2 clutch and a hydraulic pressure ($P_{C2\_}OS$) corresponding to a safety factor.

The torque input to the C-2 clutch can be calculated by calculating an engine torque from a map of throttle opening and engine speed, calculating a speed ratio from input and output speeds of the torque converter, and multiplying the engine torque thus calculated by the speed ratio. The input torque is then converted into a hydraulic pressure by dividing the input torque by a product of a pressure-receiving area of the piston of the hydraulic servo of a corresponding one of the engagement elements, the number of frictional members, an effective radius, and a friction coefficient, and adding a piston stroke pressure to the quotient. In this case, however, the hydraulic pressure ($P_{C2\_}OS$) corresponding to the safety factor is reduced from $P_{C2}a$ to $P_{C2}b$ in accordance with the proceeding of the speed-change operation, as is apparent from FIG. 9. Although release (slip) of the C-2 clutch is started by setting $P_{C2}b$ to 0 in this case, the most remarkable feature of the invention is that the proceeding degree of the speed-change operation at this moment is set at a point short of 100%. This will be described later in detail in relation to a timing for starting engagement (slip) of the C-1 clutch. While the low-pressure process is thus performed, a determination on a degree of completion (Shift R) of the speed-change operation is made (Shift R>S_End 3) in step S35 to determine whether there is a state prior to synchronization with the fourth-speed stage. As soon as the result of the determination in step S35 becomes positive, it is then determined in step S36 whether the servo hydraulic pressure ($P_{C1}$) of the C-1 clutch has exceeded a hydraulic pressure ($P_{C1\_}eg^*k$) required for maintenance of engagement with respect to the input torque ($P_{C1}>P_{C1\_}eg^*k$). In this case, k is a coefficient and assumes a value of, for example, about 0.7. The input torque used in this determination is calculated as described above. If the result of this determination becomes positive, the fourth-speed stage is established completely. Thus, the 4-3 speed-change control is then performed, i.e., the 4-3 speed-change control is started.

In the 4-3 speed-change control, a process of sweeping down the servo pressure ($P_{C2}$) of the C-2 clutch with a gradient of $dP_{C2}c$ is first performed in step S37. A determination of a degree of completion (Shift R) of the speed-change operation is made (Shift R>S_End 2) in step S38. The sweep-down operation is continued until the result of the determination in step S38 becomes positive. As soon as the result of the determination becomes positive, a low-pressure process (sweep-down with a gradient of $dP_{C2}d$) is finally performed in step S39 so as to remove the servo hydraulic pressure of the C-2 clutch completely. This process is also completed automatically as soon as a solenoid valve 2 reaches a full output. Therefore, the 4-3 speed-change control for releasing the C-2 clutch is terminated without performing any further monitoring or determining operation. Thus, the C-2 release control is terminated.

Figure 10:
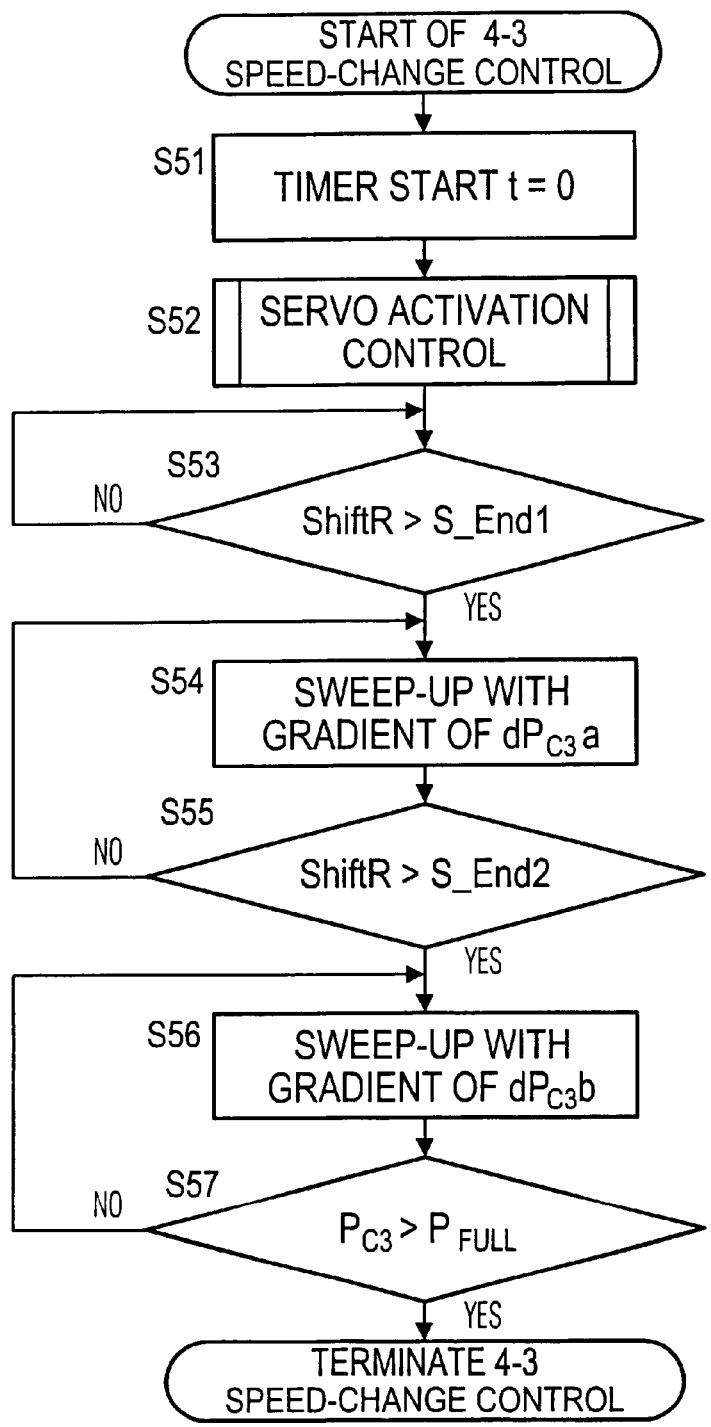
FIG. 10 is a flowchart of engagement control of a C-3 clutch during a 4-3 speed-change as part of the 6-3 speed-change operation.

A control flowchart for engaging the C-3 clutch or the fourth engagement element is shown in FIG. 10. This control is substantially identical to the aforementioned engagement control of the C-1 clutch, although they are started at different timings. In this control, the timer is first started in step S51 (start timer t=0). A servo activation control subroutine process is then performed in step S52. The process is designed to maintain a fast fill of a hydraulic pressure for filling a hydraulic servo cylinder for the C-3 clutch and a subsequent piston stroke pressure for narrowing a gap between a hydraulic servo piston and a frictional member of the engagement element. The process is a known process that is usually performed to engage a clutch.

A determination of a degree of completion as an indicator (Shift R) for making a determination of a degree of completion of a speed-change operation is made (Shift R>S_End 1) in step S53. The degree of completion (Shift R) of the speed-change operation has already been described above. Because the result of the determination is negative (No) at the outset, the processing for the determination is continued until the speed-change operation is completed. As soon as the result of the aforementioned determination becomes positive (Yes), a pressure-increasing operation for starting engagement of the C-3 clutch (sweep-up with a gradient of $dP_{C3}a$) is started in step S54. In step S55, while the pressure-increasing operation is continued, it is determined whether the degree of completion (Shift R) of the speed-change operation has reached synchronization with the third speed stage (Shift R>S_End 2). Because the result of the determination is also negative at the outset, the sweep-up operation is continued through repetition of a loop for returning to step S54 until the proceeding of the speed-change operation is completed. If the result of the determination in step S55 becomes positive, a process of increasing the servo hydraulic pressure to a line pressure (sweep-up with a gradient of $dP_{C3}b$) is performed in step S56 so as to reliably maintain engagement of the C-3 clutch. A process of determining whether the servo hydraulic pressure has reached the line pressure ($P_{C1}>P_{FULL}$) is then repeated in step S57. As soon as the result of the determination in step S57 becomes positive, the 4-3 speed-change control for engagement control of the C-3 clutch is terminated.

The contents of speed-change control performed by the speed-change control means are as described above. Adjustment of the input torque, which is performed by the torque control means in conjunction with the speed-change control, will now be described. Adjustment of the input torque in this embodiment is reduction control of the engine torque.

Figure 11:
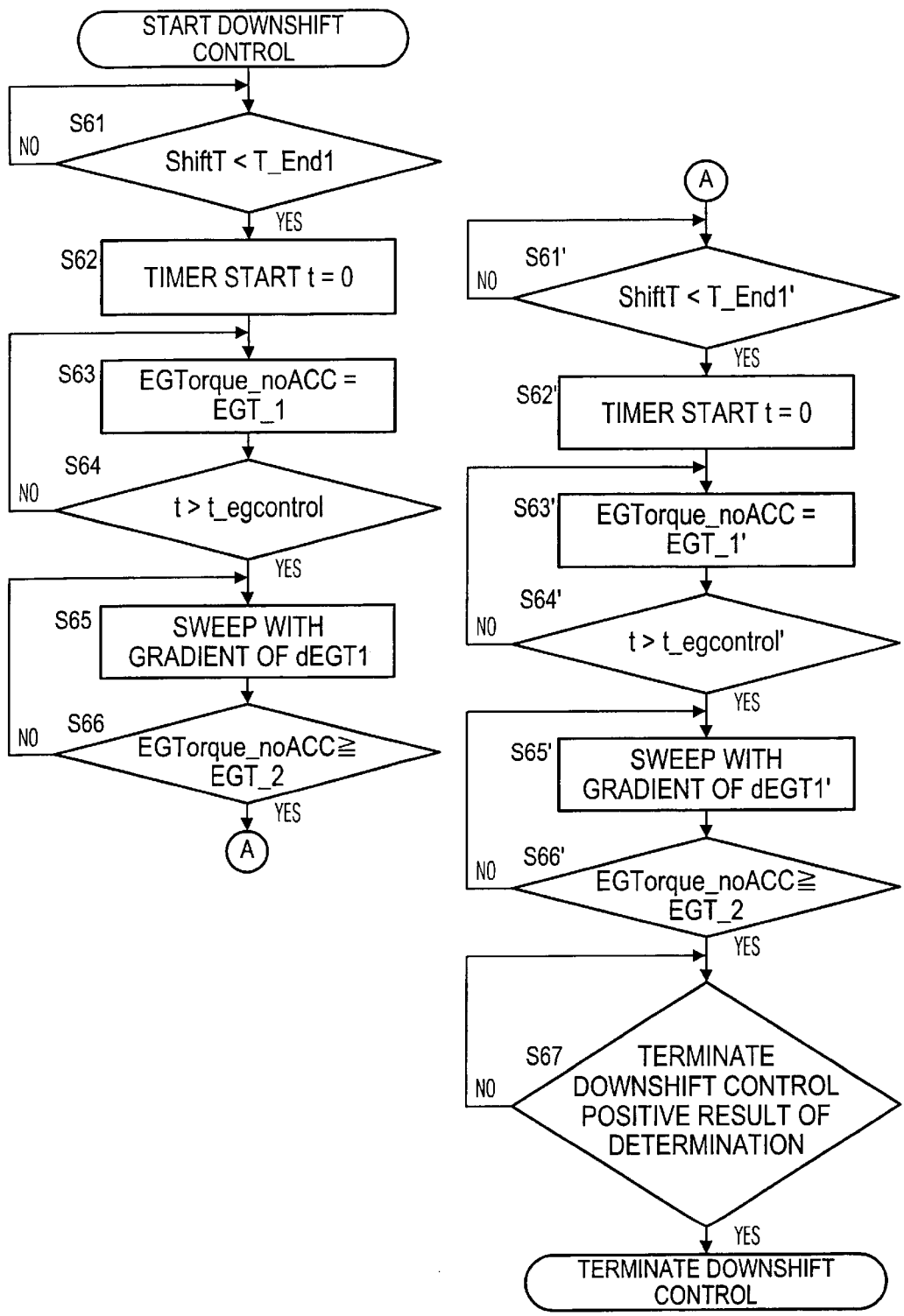
FIG. 11 is a flowchart of torque-reduction control during the 6-3 speed-change operation.

FIG. 11 shows a flowchart of torque-reduction control during the 6-3 speed-change control. In this control, as shown in FIG. 11, it is determined first in step S61 whether the control is to be started, on the basis of an indicator (Shift T) for a proceeding degree of the speed-change operation for torque control. In this case, the proceeding of the speed-change operation is set temporarily reversely and is terminated, at a point of termination 0, at the time of completion of 6-4 speed-change control, namely, at a timing (S_End 2) for starting to increase the hydraulic pressure of the hydraulic servo for the C-1 clutch to a line pressure. Accordingly, the result of the determination becomes positive if the C-1 clutch starts to slip, namely, if the 6-3 speed-change control has proceeded to a state slightly before completion of the 6-4 speed-change control (Shift T<T_End 1). If the result of the determination in step S61 becomes positive, the timer for measuring a reduction time is started (t=0) in step S62. A processing of reducing the engine torque that does not include inertia is performed (EGTorque_noACC=EGT_1) in step S63. The engine torque (EGT_1) is set higher than the engine torque during the normal 6-4 speed-change control.

While the reduction processing is thus performed, a determination on an elapsed time of torque control is then made (t>t_egcontrol) in step S64. The elapsed time (t_egcontrol) is set slightly longer than the aforementioned processing time (T_End 1). If the result of the determination in step S64 becomes positive, a reducing process for terminating the reduction processing (sweep with a gradient of dEGT1) is performed in step S65. The process is continued until it is confirmed in step S66 that the engine torque that does not include inertia (EGTorque_noACC) has become equal to or greater than a predetermined value (EGT_2). If there is established a relation EGTorque_noACC≧EGT_2, the reduction processing is terminated. Thus, the engine torque (EGTorque_noACC) again assumes a normal value. Upon completion of the 4-3 speed-change control, similar processings are performed with different control amounts. The contents of control in this case are substantially identical to the contents of the aforementioned control. Therefore, corresponding indicators of determination, processing contents, and steps are denoted by the same reference numbers marked with prime symbols (') and will not be described again. Thus, both the torque-down control operations are performed. Furthermore, if it is then determined, in step S67, that 6-3 downshift control has been terminated, the 6-3 speed-change operation is terminated.

The elapsed time t_egcontrol may be set either equal to the elapsed time t_egcontrol' or shorter than the elapsed time t_egcontrol'. By setting the elapsed time t_egcontrol shorter than the elapsed time t_egcontrol', the actual torque-down amount is reduced. Therefore, it is possible to eliminate an increase in the interval between speed-change operations upon completion of the 6-4 speed-change operation and prevent a feeling of a two-phase speed-change operation from being developed.

How the aforementioned engine torque value (EGT_1) is set will now be described. For a reference engine torque required for power transmission, a torque-down amount dT is expressed by the equations shown below, wherein dTa represents an amount corresponding to inertia that is generated by changes in input speed and engine speed immediately before torque reduction, and wherein dTb represents an engine torque that does not include inertia:

$$dT = dTa + dTb,$$

$$dTa = GainA \times T_{inertia},$$

$$dTb = GainB \times T_{E/B}.$$

It is to be noted herein that $T_{inertia}$ represents an inertia torque. A gain (GainA) by which the inertia torque $T_{inertia}$ is multiplied is set in accordance with an output speed. As shown in FIG. 12 as an example, during normal power-on downshift, the gain (GainA) assumes a value A, B, C, D, or E for an output speed of Nout 1, Nout 2, Nout 3, Nout 4, or Nout 5, respectively. During the 6-3 speed-change control, the gain (GainA) is set as a value A', B', C', D', or E', which is smaller than A, B, C, D, or E, respectively. Further, $T_{E/B}$ represents an engine torque that does not include inertia. A gain (GainB) by which the engine torque $T_{E/B}$ is multiplied is set in accordance with an input torque. As shown in FIG. 13 as an example, during normal power-on downshift, the gain (GainB) assumes a value F, G, H, I, or J for an input torque of Tq_1, Tq_2, Tq_3, Tq_4, or Tq_5, respectively. During the 6-3 speed-change control, the gain (GainB) is set as a value F', G', H', I', or J', which is smaller than F, G, H, I, or J, respectively.

Figure 14:
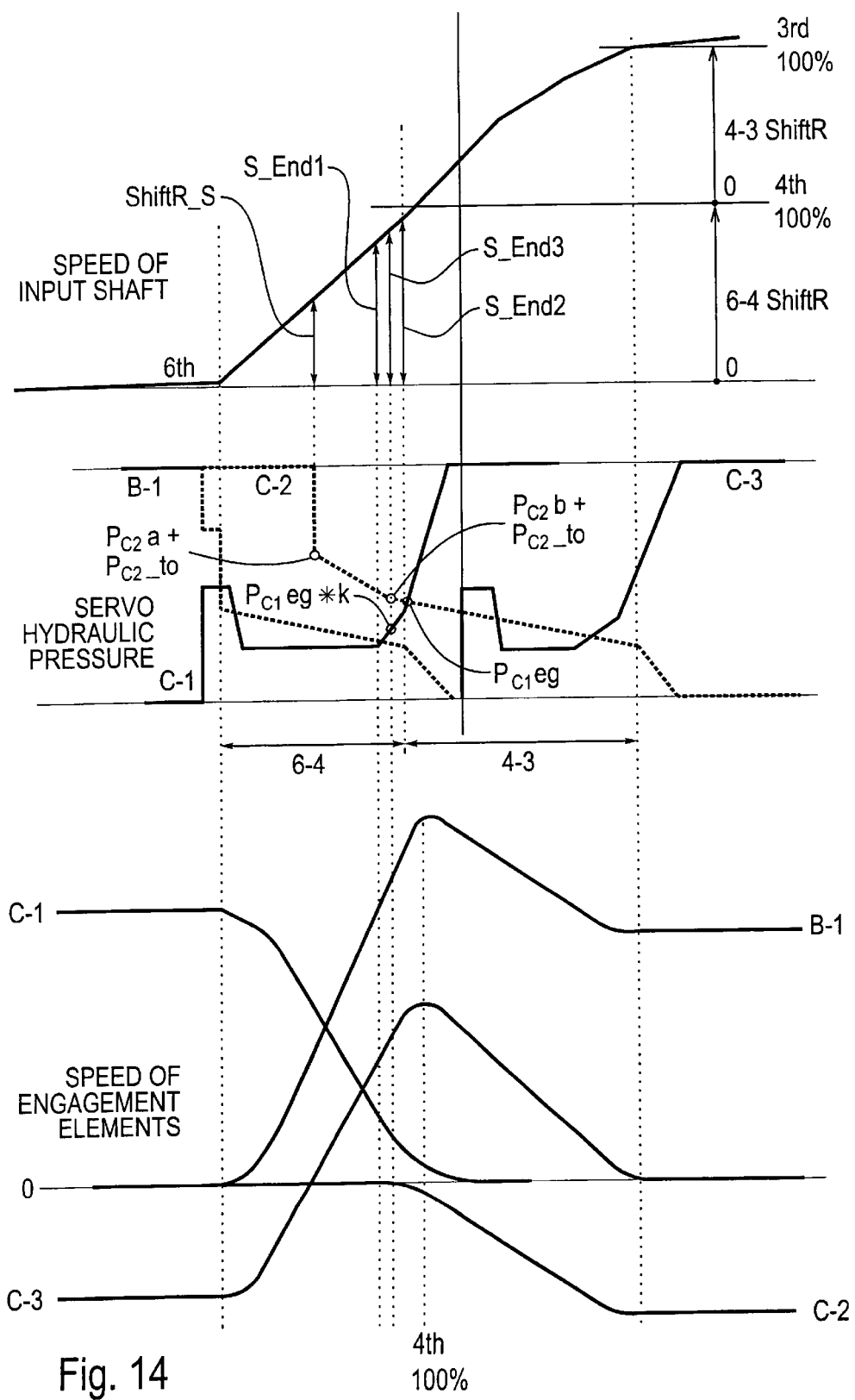
FIG. 14 is a time chart showing control relationships among the engagement elements during the 6-3 speed-change operation.

FIG. 14 is a time chart showing how the four engagement elements operate during the aforementioned 6-3 speed-change control, as a relationship between servo hydraulic pressure and speed of the input shaft. The time chart schematically shows a speed-change characteristic including the influence of the aforementioned reduction process of reducing the engine torque. The influence of the reduction process on the speed-change characteristic will be described later with reference to another time chart. In FIG. 14, it is assumed that the speed of a brake as an engagement element is positive in the case where its rotation-side element rotates in the same direction as the engine and that the speed of the brake is negative in the opposite case. In FIG. 14, it is assumed that the speed of a clutch as an engagement element is positive on the side where the side of the output element rotates in an accelerated manner in the same direction as the engine with respect to an input rotation of the clutch and that the speed of the clutch is negative in the opposite case.

As can be seen from FIG. 14, engagement control of the C-1 clutch and release control of the B-1 brake are started simultaneously. While the servo hydraulic pressure of the C-1 clutch is increased to a fast-fill pressure, the servo hydraulic pressure of the B-1 brake is temporarily set as a low pressure lower than a line pressure and then is reduced to a predetermined pressure for commencement of the release. Thereby, the 6-4 speed-change operation is started, so that the speed of the input shaft starts to increase. The servo hydraulic pressure of the B-1 brake is then reduced with a constant gradient, and the servo hydraulic pressure of the C-1 clutch is maintained at a piston stroke pressure, so that the C-1 clutch assumes an engagement-awaiting state. At this moment, the B-1 brake starts to slip, whereby the sun gears S3, S2 proceed in directions of deceleration and acceleration respectively with respect to a point of engagement of the C-2 clutch, that is in engagement, as is apparent by referring to FIG. 4. Thereby, the rotational-element side of the B-1 brake starts to rotate positively from a locked state corresponding to 0.

As for the output-element side of the C-3 clutch, the output-element side is accelerated from negative rotation on the output-element side with respect to decelerated rotation on the input-element side, and proceeds toward positive rotation. On the other hand, the C-1 clutch is decelerated in the same direction as and at the same speed of rotation of the engine from a state of positive rotation, that has been substantially accelerated, with respect to rotation of the engine.

If the speed of the input shaft then rises so that the timing for starting release control of the C-2 clutch is attained, the servo hydraulic pressure of the C-2 clutch is rapidly reduced to a hydraulic pressure where release (slip) of the C-2 clutch is not caused. The servo hydraulic pressure of the C-2 clutch is then reduced with a predetermined gradient. On one hand, the 6-4 speed-change operation proceeds toward synchronization with the fourth-speed stage. If it is determined that the operation has proceeded from the speed of the input shaft and reached a state of 70% prior to synchronization with the fourth-speed stage (S_End 1), the servo hydraulic pressure of the C-1 clutch is increased. As a result, engagement (slip) of the C-1 clutch proceeds. If the C-1 clutch reaches 90% prior to a state of completion of engagement, it is determined from the speed of the input shaft that a state prior to synchronization with the speed of the input shaft is achieved (S_End 2). Therefore, the servo hydraulic pressure of the C-1 clutch is switched to a state of a rise toward the line pressure. On the other hand, the servo hydraulic pressure of the C-2 clutch during descent control is controlled through the reduction control in such a manner as to become a hydraulic pressure suited to reach a state prior to commencement of release when it is determined that a state prior to synchronization with the fourth-speed stage has been achieved (S_End 3). Therefore, at this stage, a second-stage control state for changing a gradient is started. At this moment, the C-2 clutch starts to slip and rotates negatively. Immediately thereafter, the C-1 clutch that has been decelerated in a state of deceleration of slip from a state of deceleration of release proceeds toward null rotation of engagement. Meanwhile, the speed of the C-3 clutch continues to increase. If it is determined that the servo hydraulic pressure of the C-1 clutch has reached the line pressure, engagement control of the C-3 clutch is started. Thereby, after reaching a peak upon synchronization with the fourth-speed stage (4th 100%), the speed of the C-3 clutch starts to decrease. The C-3 clutch then passes through a state of deceleration by slippage and proceeds toward a state of null rotation of complete engagement. The hydraulic control that is performed in accordance with the proceeding of engagement of the C-3 clutch is identical to the control in the case of the C-1 clutch, except that a determination of the proceeding degree of 70% or a state prior to synchronization is made on the basis of the third-speed stage instead of the fourth-speed stage. If synchronization with the third-speed stage is then achieved due to the proceeding of the 4-3 speed-change operation, the servo hydraulic pressure of the C-2 clutch is released completely, and the servo hydraulic pressure of the C-3 clutch is increased to a line pressure. Thus, the 6-3 speed-change operation is realized in a successive manner, namely, in the form of 6-4-3 speed-change operations.

Figure 15:
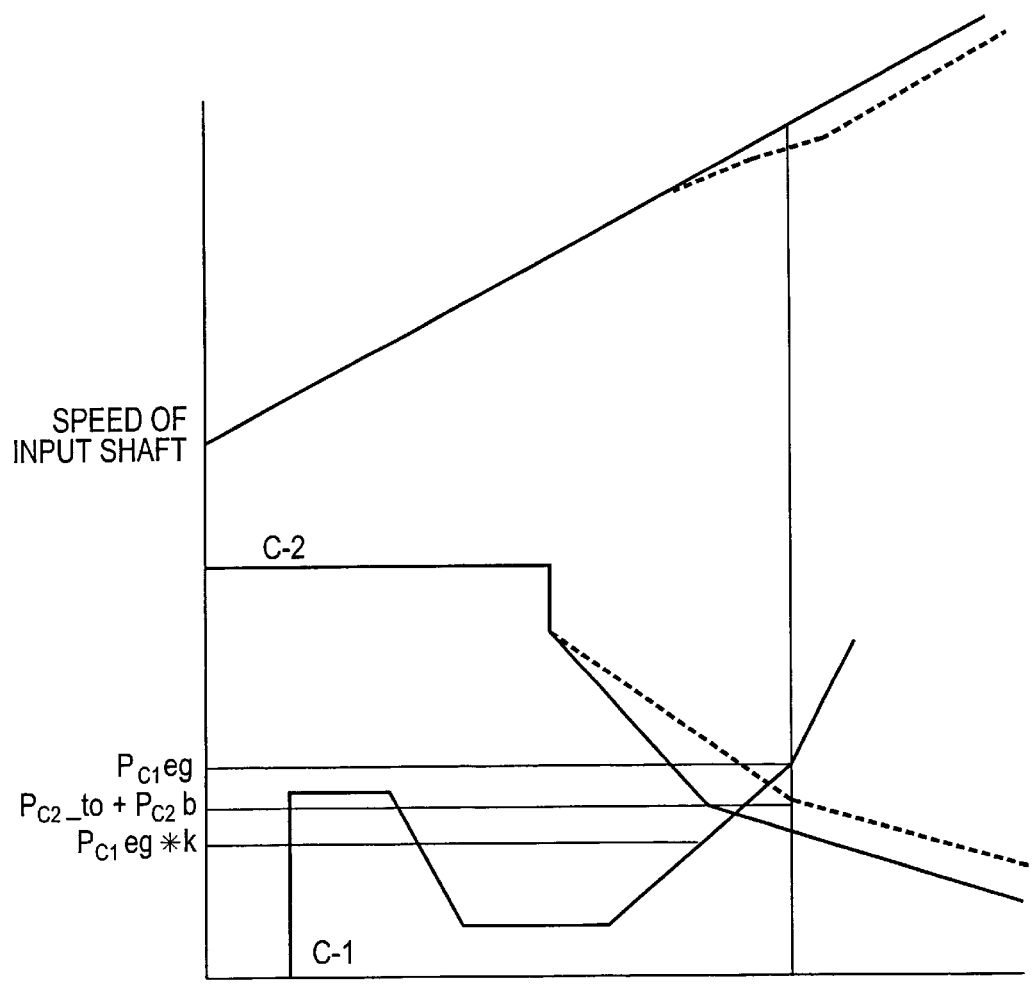
FIG. 15 is a time chart showing how the relationship of engagement and release between two clutches during the 6-3 speed-change operation is related to the proceeding of the speed-change operation.

The influence of behaviors of the release-side C-2 clutch and the engagement-side C-1 clutch on changes in speed of the input shaft in this case will be described further in detail with reference to FIG. 15. As shown in FIG. 15, if the pressure of the hydraulic servo for the C-2 clutch is reduced as indicated by a dotted line while the pressure of the hydraulic servo for the C-1 clutch is increased, the C-1 clutch starts to have a torque capacity before the C-2 clutch starts to slip. Therefore, the speed of the input shaft becomes slower as indicated by the dotted line in FIG. 15 due to the recession of torque. This is felt by a driver as a shock in the course of a speed-change operation. Such slowing of the speed of the input shaft occurs inevitably even if a point of commencement of release ($P_{C1}$eg) of the C-1 clutch and a point of complete engagement ($P_{C2}$to+$P_{C2}$b) of the C-2 clutch can be theoretically made to coincide with each other. On the other hand, if the pressure of the hydraulic servo for the C-2 clutch is reduced as indicated by a solid line in FIG. 15 according to this embodiment, the C-1 clutch is engaged completely immediately after the C-2 clutch has started to slip. Therefore, a continuously rising state of the speed of the input shaft for counterbalancing the aforementioned slowing by a suitable amount of engine prefiring can be achieved in a slip state immediately after release of the C-2 clutch has been started and in a slip state immediately before engagement of the C-1 clutch is completed.

Figure 16:
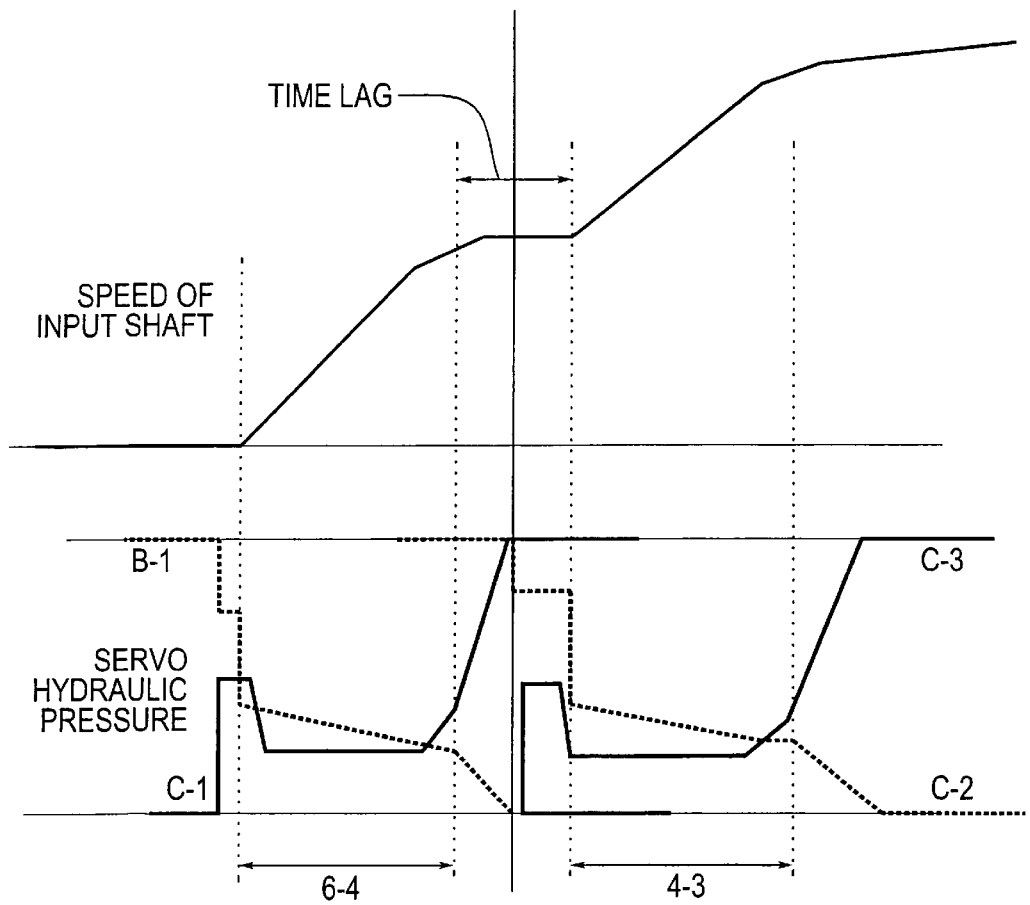
FIG. 16 is a time chart showing a conventional control relationship among the engagement elements during 6-4 and 4-3 speed-change operations.

FIG. 16 is a time chart showing conventional two-phase speed-change operations, namely, 6-4 and 4-3 speed-change operations, in contrast with the aforementioned 6-4-3 speed-change operation. In the time chart shown in FIG. 16, substantial speed-change periods are indicated by bi-directional arrows 6-4 and 4-3. There is a period shown as a time lag in FIG. 16 between both the speed-change periods. This period is an invalid period in which no substantial speed-change operation is performed. On the other hand, in the time chart shown in FIG. 14, a period indicated by a bidirectional arrow 4-3 continues from a period indicated by a bi-directional arrow 6-4. Thus, the speed-change period can be reduced by the period corresponding to the aforementioned time lag.

Figure 17:
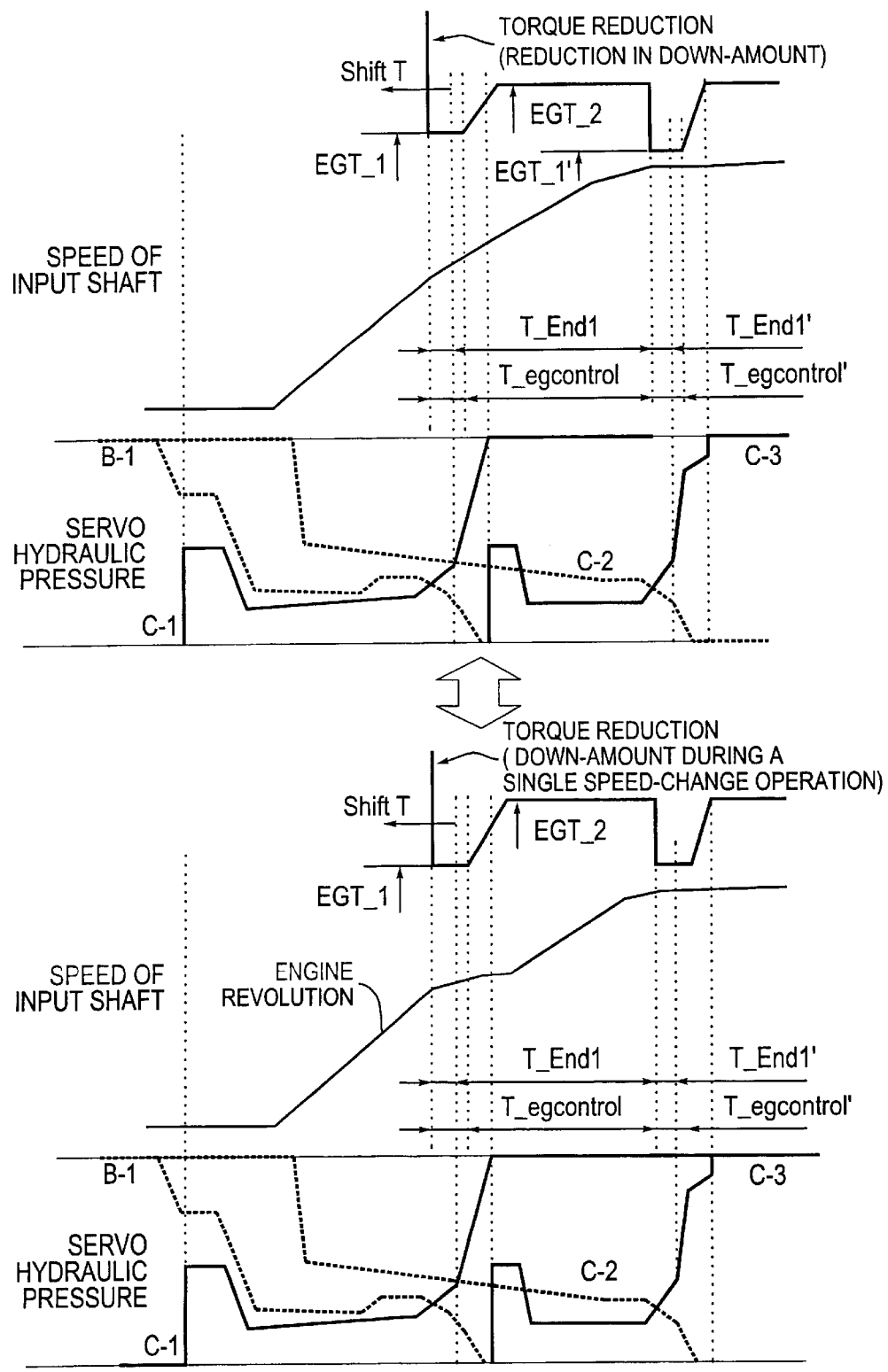
FIG. 17 is a time chart showing the influence of torque-reduction control on the speed-change characteristic during the 6-3 speed-change operation.

FIG. 17 is a time chart showing a relationship between the aforementioned 6-4-3 speed-change operation and torque reduction. This is a contrastive chart with only the torque-down amount changed, under the assumption that the speed-change time, the reduction timing, and the reduction time remain substantially unchanged. As shown in the lower section in FIG. 17, in the case where the torque-down amount is suited to a single 6-4 speed-change operation, the engine speed is slowed down from a timing when reduction is started to a timing when reduction is terminated.

However, a multiple changeover speed-change operation is made possible without causing any substantial change in rotation (speed-change shock). It has been revealed that the slowing of the engine speed occurring from the timing when reduction is started to the timing when reduction is terminated results mainly from the fact that the torque-down amount suited for a single 6-4 speed-change operation is directly used in a speed-change operation in which four engagement elements are changed over. Therefore, if the torque-down amount is reduced in comparison with the case of the single 6-4 speed-change operation as shown in the upper section in FIG. 17, the influence of the reduction can be prevented from emerging as a change in engine speed. Thereby, the engine speed is prevented from becoming slower and changes with a substantially constant gradient. That is, the change in engine speed is substantially constant and is felt by the driver as a speed-change feeling caused by a single 6-3 speed-change operation.

Thus, according to the speed-change control apparatus of the aforementioned first embodiment, release of the C-2 clutch is started after release of the B-1 brake has been started, and engagement of the C-3 clutch is completed after engagement of the C-1 clutch has been completed. Thus, throughout the speed-change period, one engagement element, namely, the C-2 clutch remains engaged until commencement of its release, and the C-1 clutch remains engaged after the completion of its engagement. In this manner, the speed-change period for maintaining engagement is prolonged, and the period in which there arises a state where all four of the engagement elements are slipping is minimized. Besides, release of the C-2 clutch is started before engagement of the C-1 clutch is completed, whereby a speed-change state where simultaneous and complete engagement of two elements never occurs is obtained. Therefore, it is possible to perform a continuous speed-change operation instead of two-phase speed-change operations, so that the speed-change operation proceeds ideally.

In addition, the hydraulic pressure supplied to the C-2 clutch is reduced by a predetermined amount as a speed-change operation proceeds toward the third speed-change stage (fourth speed). Thus, the smaller the degree of completion of the speed-change operation is, the higher the hydraulic pressure supplied to the C-2 clutch. Therefore, prefiring of the engine or the like is prevented in the course of the speed-change operation to the third speed-change stage (fourth-speed stage). As the speed-change operation proceeds, the hydraulic pressure supplied to the C-2 clutch is reduced. Therefore, the speed-change operation to the second speed-change stage (third-speed stage) can be started without causing any time lag.

In setting a stand-by hydraulic pressure supplied to the C-2 clutch, if it is set as a hydraulic pressure corresponding to an input torque that is input to the transmission at that moment, the C-2 clutch can be theoretically held without slipping. In fact, however, the hydraulic pressure is usually set as a value including a certain safety factor, to account for variability in the manufacture and assembly of the components, e.g., manufacturing tolerances. If the safety factor is set too large, the speed-change operation from the third speed-change stage (fourth-speed stage) to the second speed-change stage (third-speed stage) is started with a delay. Conversely, if the safety factor is set too small, the C-2 clutch slips and the prefiring of the engine is caused in the case where the dispersion regarding the hard system is larger than the safety factor. Accordingly, the safety factor is reduced from a large value in accordance with the proceeding degree of the speed-change operation from the first speed-change stage (the sixth-speed stage) to the third speed-change stage (the fourth-speed stage). Thereby, it becomes possible to prevent the speed-change operation to the second speed-change stage (third-speed stage) from being started with a delay and reliably prevent the prefiring of the engine at the time of termination of the speed-change operation to the third speed-change stage (fourth-speed stage).

Especially in this embodiment, the servo hydraulic pressure of the B-1 brake is controlled to be reduced to a hydraulic pressure corresponding to an input torque upon commencement of the speed-change operation, whereby the B-1 brake starts to slip. Therefore, the input speed starts to rise immediately. Accordingly, this operation serves not only to reduce the actual speed-change time but also to create a feeling of quickness in the speed-change operation. In particular, the operation effectively serves to improve response and the driving feel during a kick-down speed-change operation. As a result, a skip speed-change operation for swiftly responding to a requirement made by the driver is performed.

Besides, while the process of the speed-change operation is thus optimized, the rotational acceleration of the engine in a last stage of a single speed-change operation is reduced in general. Also, while employing the same method as torque-down control that is performed to reduce a shock resulting from abrupt restoration of an output torque at the time of termination of the speed-change operation, a delay in the completion of engagement of the C-1 clutch resulting from a deficiency in input torque is prevented by reducing the torque-down amount immediately before the 6-4 speed-change operation is completed. Therefore, it becomes possible to make a smooth transition to the 4-3 speed-change operation. As a result, continuity of the speed-change operation is guaranteed.

As a method of performing torque-down control of the engine, it is conceivable to reduce the amount of intake air through control for retarding an ignition timing of the engine, fuel-cut control, or control of an electronic throttle. In the case of retardation control or fuel-cut control, the time lag from actual output of a command to a decrease in output torque of the engine is smaller in comparison with the responding characteristic of the hydraulic pressure of the automatic transmission. In the case where the electronic throttle is controlled, the time lag is often large. Therefore, it is conceivable to change the timing for issuing a torque-down command depending on the responding characteristic of the method of actually performing torque-down control. For instance, in order to ensure that the output torque is actually reduced at a timing close to the commencement of engagement of a clutch of the automatic transmission, it is possible to take the following measures in response to a command to start engagement of a hydraulic servo for a frictional engagement element of the automatic transmission. That is, it is possible to retard the timing for outputting a torque-down command in the case of retardation control or fuel-cut control, and advance the timing for outputting a torque-down command in the case where the electronic throttle is controlled. However, the responding characteristic of torque-down control or the responding characteristic of the hydraulic pressure of the automatic transmission changes depending on the engine or the automatic transmission. Therefore, it is appropriate that the timing for issuing a command for torque-down control be changed appropriately depending on the characteristics.

Figure 18:
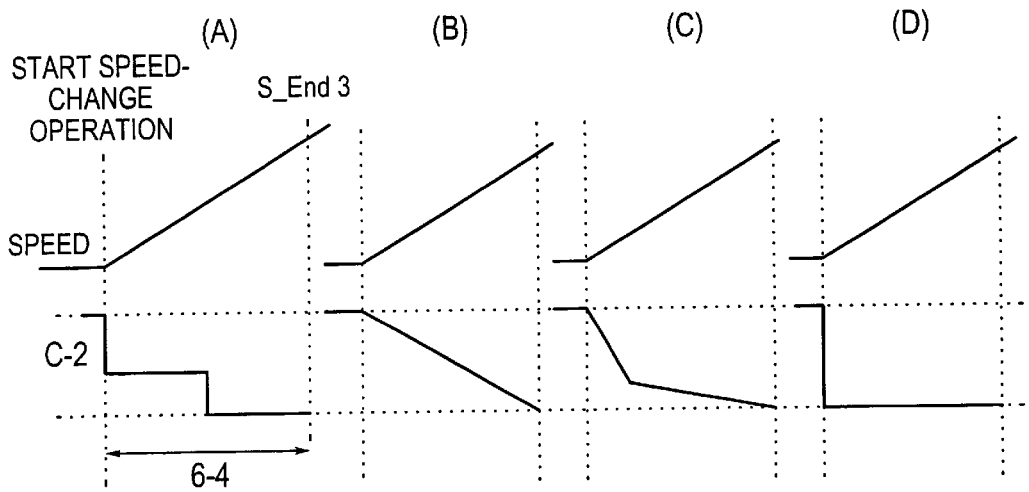
FIG. 18 is a time chart showing, in contrast to the first embodiment, various modification examples of the hydraulic-pressure characteristic for releasing the C-2 clutch during the 6-3 speed-change operation.

In the aforementioned first embodiment, the servo hydraulic pressure of the C-2 clutch is continuously swept down with a predetermined gradient to a speed-change state (S_End 3) prior to synchronization with the fourth-speed stage in the course of a speed-change operation to the fourth-speed stage. This reduction characteristic of the hydraulic pressure may be replaced. FIG. 18 shows modification examples of this characteristic, in which the servo hydraulic pressure of the C-2 clutch is swept down as soon as the speed-change operation to the fourth-speed stage (rotational change) is started. The characteristic (A), shown in FIG. 18, is an example in which the hydraulic pressure is step-wise reduced and held. The characteristic (B), shown in FIG. 18, is an example in which the hydraulic pressure is reduced with a predetermined gradient. The characteristic (C), shown in FIG. 18, is an example in which the hydraulic pressure is reduced with a variable gradient. The characteristic (D), shown in FIG. 18, is an example in which the hydraulic pressure is reduced to and held at a predetermined pressure. Reduction of the hydraulic pressure may also be started when a command to perform the speed-change operation is issued. As is apparent from the foregoing description, the reduction characteristic of the hydraulic pressure may be modified in different ways instead of being limited to the characteristic of the aforementioned first embodiment.

Figure 19:
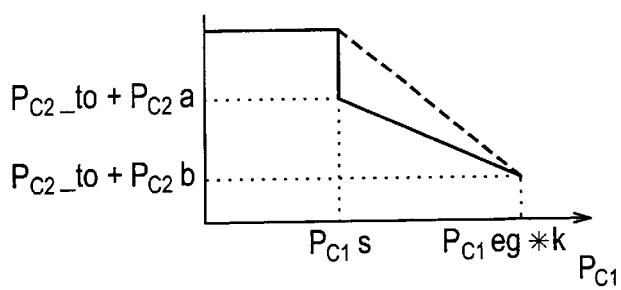
FIG. 19 is a hydraulic-pressure characteristic diagram of servo hydraulic-pressure control during the 6-3 speed-change operation performed by a control apparatus according to a second embodiment of the invention.

By the same token, the timing for starting reduction of the hydraulic pressure may be modified in different ways. FIG. 19 shows a method according to a second embodiment of the invention in which reduction of the hydraulic pressure is started at a different timing. This embodiment is designed such that reduction of the hydraulic pressure ($P_{C2}$) of the C-2 clutch, that is released in the 4-3 speed-change operation, is started as soon as the hydraulic pressure ($P_{C1}$) of the C-1 clutch, that is engaged in the 6-4 speed-change stage, exceeds a predetermined pressure ($P_{C1}s$). The initial hydraulic pressure ($P_{C2}$) during pressure reduction in this case is set as $P_{C2}to+P_{C2}a$. In FIG. 18, the characteristic indicated by a broken line is a characteristic of the hydraulic pressure in the case where the safety factor is not taken into account.

Reduction control of the hydraulic pressure ($P_{C2}$) of the C-2 clutch makes it possible to control the timing for starting reduction of the hydraulic pressure exclusively through a determination based on a rise in the servo hydraulic pressure of the C-1 clutch. For this reason, there is no need to additionally provide a sensor for detecting a torque. Therefore, reduction control according to the second embodiment is advantageous in that a reduction in cost can be achieved.

Figure 20:
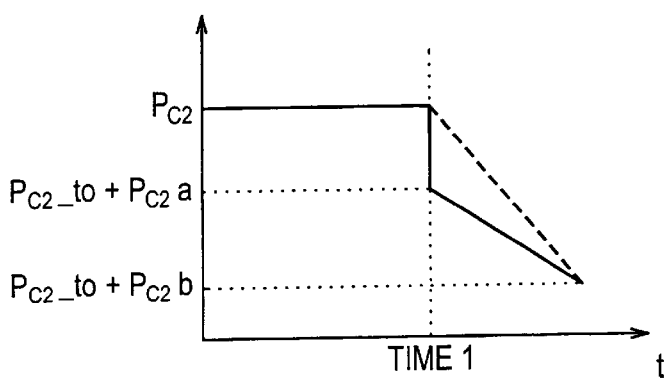
FIG. 20 is a time chart of servo hydraulic-pressure control during the 6-3 speed-change operation performed by a control apparatus according to a third embodiment of the invention.

FIG. 20 shows a method according to a third embodiment of the invention in which reduction of the hydraulic pressure ($P_{C2}$) of the C-2 clutch, that is released in the 4-3 speed-change phase, is controlled by means of a timer. In this embodiment, the proceeding degree of a 6-4 speed-change operation is estimated by measurement using a timer (t) that is started upon commencement of the speed-change operation. The time measured by the timer is compared with a preset time (Time 1) at a timing prior to synchronization with the fourth-speed stage, and reduction of the hydraulic pressure is then started. It is appropriate that the predetermined time (Time 1) be stored in the speed-change control apparatus in the form of a map. In this embodiment as well, the characteristic indicated by a broken line in FIG. 20 is a characteristic of the hydraulic pressure in the case where the safety factor is not taken into account.

In the case of control according to this embodiment, reduction of the hydraulic pressure supplied to the C-2 clutch is started after the passage of a predetermined time (Time 1) from the start of the speed-change operation to the third speed-change stage (fourth-speed stage). Thus, it is possible to start to reduce the hydraulic pressure of the C-2 clutch prior to a speed-change operation to the second speed-change stage (third-speed stage) through an extremely simple structure. As a result, installation of a sensor to make a determination on the proceeding degree of a speed-change operation is unnecessary. Furthermore, doing so prevents an increase in the required memory capacity of a control unit (ECU) for program processing.

Figure 21:
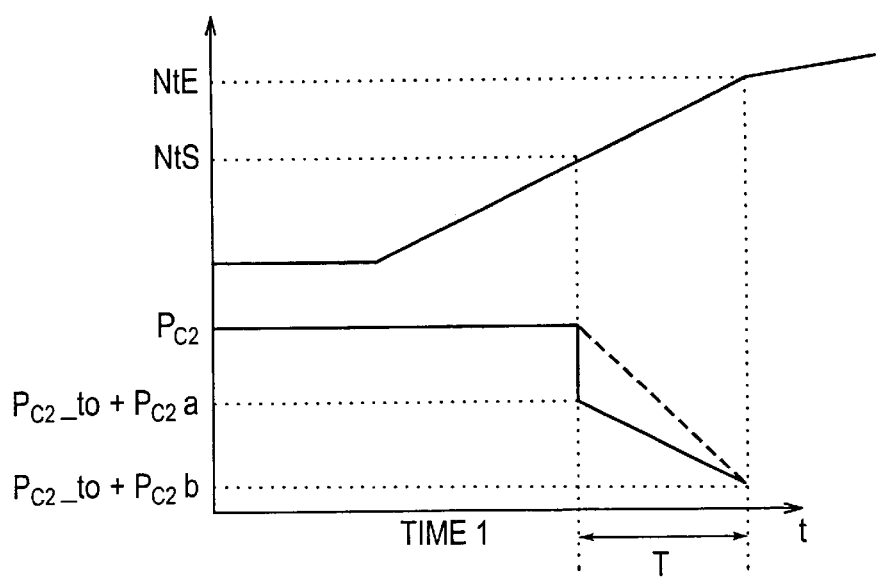
FIG. 21 is a time chart of servo hydraulic-pressure control during the 6-3 speed-change operation performed by a control apparatus according to a fourth embodiment of the invention.

FIG. 21 shows a method according to a fourth embodiment of the invention in which the reduction of the hydraulic pressure ($P_{C2}$) of the C-2 clutch, that is released in the 4-3 speed-change stage, is controlled on the basis of the speeds of the input shaft and the output shaft of the transmission. In this embodiment, a time (T) required for the C-2 clutch to start to slip is set in advance through experimentation, computer simulation, or the like. A rotational acceleration ($\Delta Nt$) during the 6-4 speed-change operation is then calculated, whereby the amount of change in speed occurring within the time (T) is calculated. By multiplying the speed of the output shaft of the transmission at the beginning of the 6-4 speed-change operation by a post-speed-change gear ratio (fourth-speed stage), a speed of the input shaft of the transmission at the time of termination of the 6-4 speed-change operation is predicted. The amount of change in speed occurring prior to the C-2 clutch starting to slip is subtracted from the predicted speed of the input shaft, whereby a speed (NtS) of the input shaft of the transmission at which reduction of the hydraulic pressure of the C-2 clutch is started is calculated. This relationship is expressed by an inequality shown below:

Nt>post-speed-change fourth-speed gear ratio×speed of output shaft−$\Delta Nt \times T$.

In this embodiment as well, the characteristic indicated by a broken line in FIG. 21 is a characteristic of the hydraulic pressure in the case where the safety factor is not taken into account.

The time (T) required for the C-2 clutch to start to slip is thus set, and the speed (NtS) for starting to reduce the hydraulic pressure supplied to the C-2 clutch is calculated from the time (T) on the basis of the rotational acceleration ($\Delta Nt$). Thereby it becomes possible to start the speed-change operation to the second speed-change stage (third-speed stage) without causing any time lag. It also becomes possible to prevent the prefiring of the engine from being caused when the speed-change operation to the third speed-change stage (fourth-speed stage) is terminated.

Figure 22:
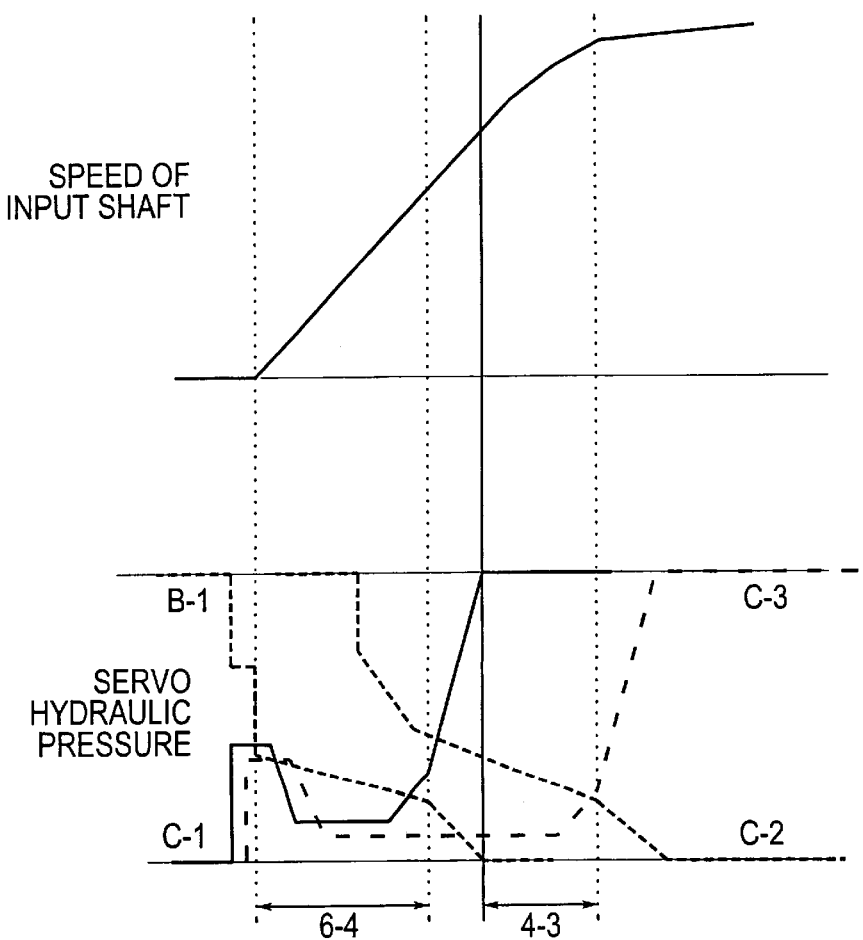
FIG. 22 is a time chart of servo hydraulic-pressure control during the 6-3 speed-change operation performed by a control apparatus according to a fifth embodiment of the invention.

In the aforementioned respective embodiments, hydraulic-pressure control for releasing the C-2 clutch is modified in different ways with respect to the first embodiment. The timing for supplying a hydraulic pressure to the C-3 clutch may also be modified with respect to the first embodiment. FIG. 22 shows a time chart according to a fifth embodiment of the invention, which is modified in this respect. This embodiment adopts a method wherein the C-3 clutch starts being supplied with a hydraulic pressure as soon as the 6-4 speed-change operation is started and wherein attainment of a low hydraulic pressure (piston stroke pressure), at which the piston of the hydraulic servo shortens an invalid stroke and the frictional member is about to be engaged, is awaited after fast fill.

Although the case of the 6-3 speed-change operation has been described, the speed-change control is performed in a similar manner in the case of the 5-2 speed-change operation as well, except that the engagement elements to be controlled are different. In this case, the first engagement element, the second engagement element, and the third engagement element are the C-2 clutch, the C-3 clutch, and the C-1 clutch, respectively. However, this gear train is specially designed in that the second-speed stage is established through engagement (lock) of the F-1 one-way clutch as the fourth engagement element instead of engagement of the B-1 brake. Therefore, unlike the case of the 6-3 speed-change operation, hydraulic-pressure control for engaging the B-1 brake in the second speed-change stage (the 3-2 speed-change operation) is unnecessary. As a result, simplification of control is achieved accordingly.

Figure 23:
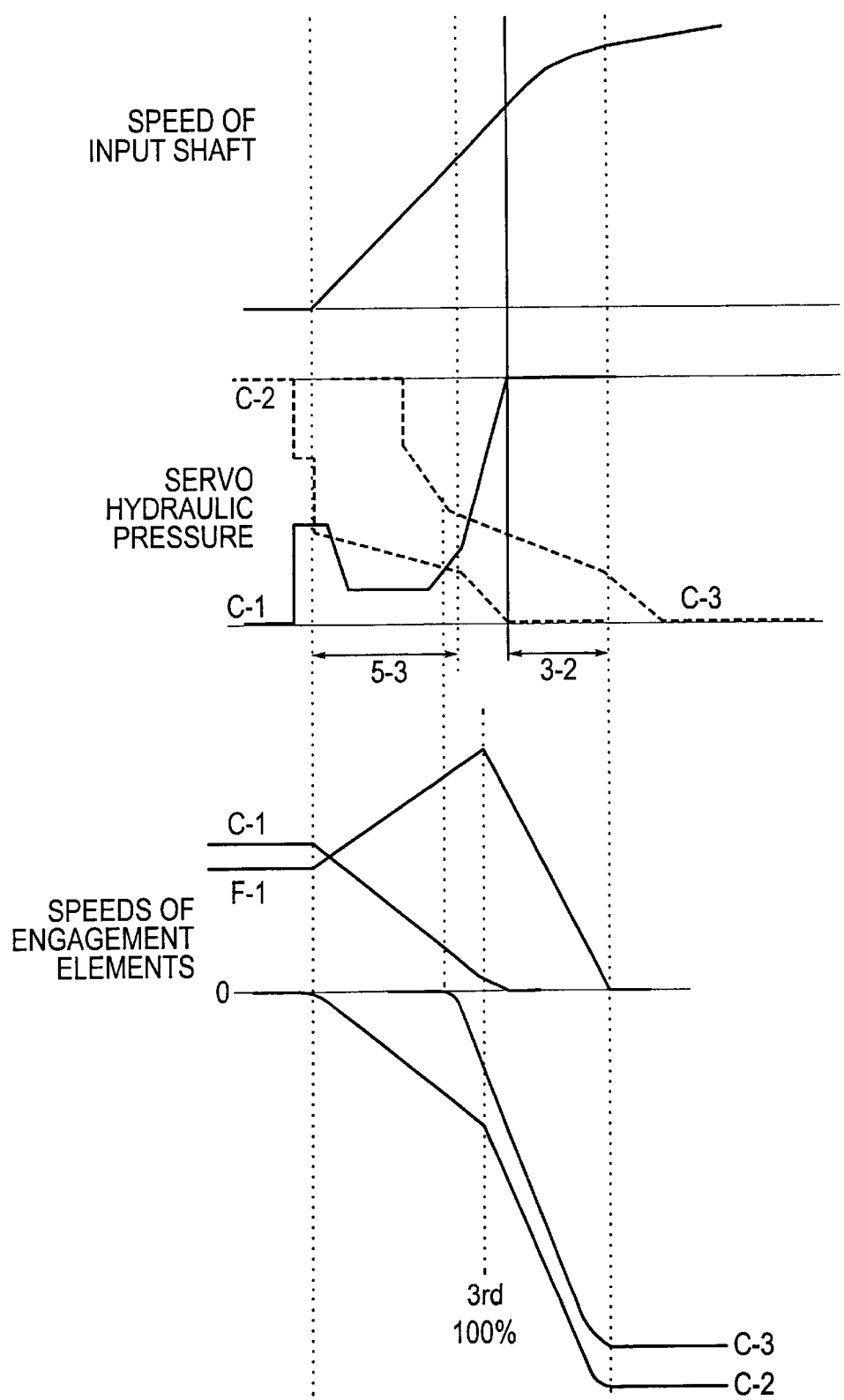
FIG. 23 is a time chart showing a control relationship among engagement elements during a 5-2 speed-change operation performed by the control apparatus according to the first embodiment of the invention.

FIG. 23 shows a time chart of a 5-2 (5-3-2) speed-change operation. In this case, release control of the C-2 clutch is performed according to a similar control method instead of the B-1 brake of the first embodiment, and release control of the C-3 clutch is performed according to a similar method instead of the C-2 clutch. As described above, engagement of the B-1 brake, which is to replace engagement of the C-3 clutch, is replaced with automatic engagement of the F-1 one-way clutch. Thus, engagement of the B-1 brake is not controlled. The description of the rotation of the respective engagement elements is omitted.

Reference to a diagram of speeds of the engagement elements, which has been drawn in the same manner as the time chart of the first embodiment shown in FIG. 11, and to the speed diagram shown in FIG. 4 makes it possible to understand how the engagement elements rotate. In the case of a 5-2 speed-change operation, when a speed-change operation from the third speed-change stage (third-speed stage) to the second speed-change stage (second-speed stage) can be performed simply by operating the C-3 clutch as the second engagement element on the release side. Therefore, a simplification in control is achieved. In addition, as is apparent from changes in speed of the F-1 one-way clutch shown in FIG. 23, the F-1 one-way clutch is automatically locked as soon as the C-2 clutch is released completely, whereby the speed-change operation is terminated. Therefore, it also becomes possible to shorten the speed-change period.

Figure 24:
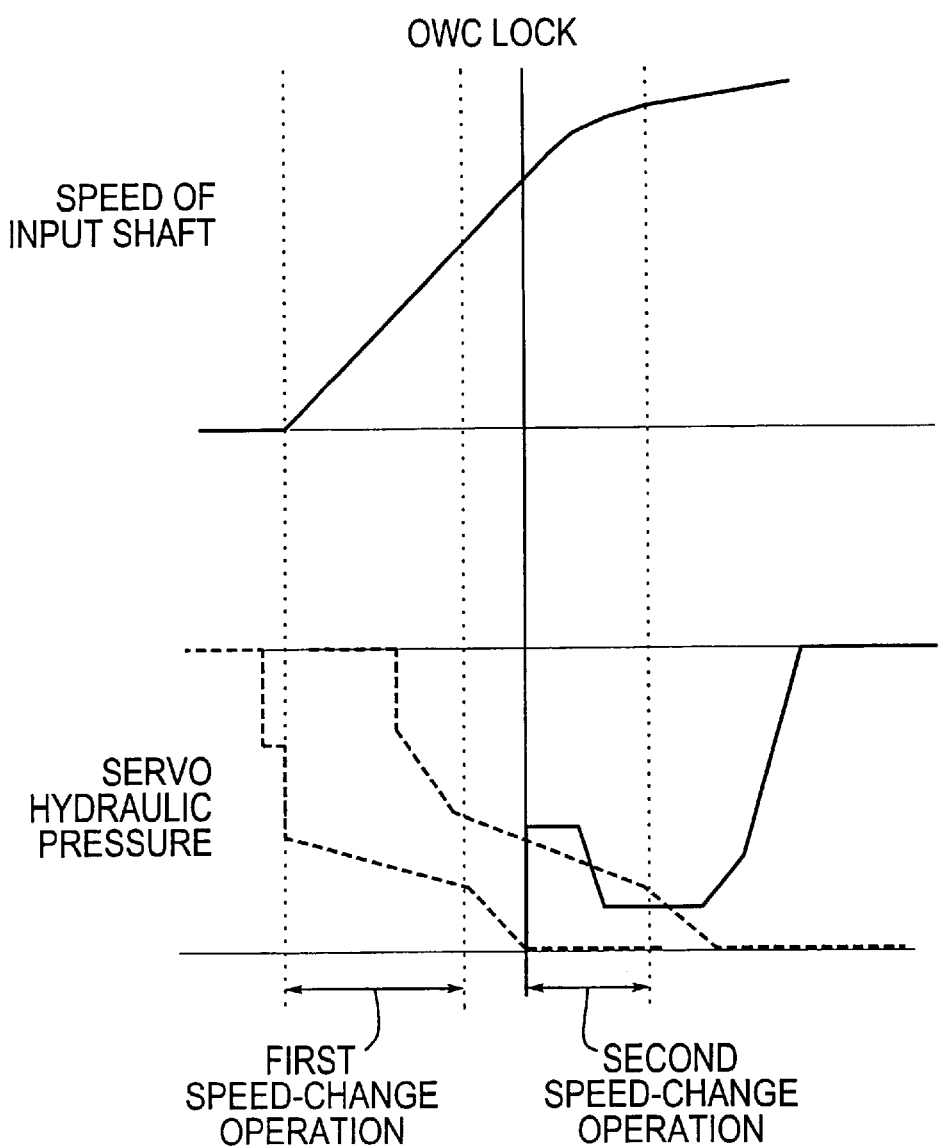
FIG. 24 is a time chart of servo hydraulic-pressure control performed by a control apparatus according to a sixth embodiment of the invention.

FIG. 24 shows a time chart for a speed-change operation in the case of a gear train in which engagement by a one-way clutch is used in the third speed-change stage instead of engagement of a brake as opposed to the aforementioned relationship regarding engagement in general, although this relationship does not hold true for the gear train shown as an example. In such a case, as shown in FIG. 24, a determination of synchronization with the third speed-change stage by the first speed-change stage can be made on the basis of a lock state of a one-way clutch that constitutes the third engagement element in this case. In addition, the hydraulic pressure for engagement is controlled by controlling the servo hydraulic pressure of a single engagement element at the time of the second speed-change stage. Thus, a further simplification in control is achieved.

The invention has been described in detail referring to its representative embodiments regarding the specific gear train. However, the concept of the invention is not to be limited to the gear train shown as an example. The invention is applicable to all the gear trains wherein a relationship of engagement and release among engagement elements in a speed-change operation to which four engagement elements are related is established by simultaneously changing over of two elements.

What is claimed is:

1. A control apparatus for an automatic transmission wherein operation of four engagement elements is required at the time of a speed-change operation from a first speed-change stage to a second speed-change stage, wherein the first speed-change stage is established through engagement of a first engagement element and a second engagement element, and wherein the second speed-change stage is established through engagement of a third engagement element and a fourth engagement element, comprising:

input torque control means for starting to adjust a torque input to the automatic transmission during engagement control of the third engagement element and during engagement control of the fourth engagement element respectively, wherein the input torque control means starts to reduce the input torque during engagement control of the third engagement element and during engagement control of the fourth engagement element respectively, and release of the second engagement is started after release of the first engagement element has been started, and engagement of the fourth engagement element is completed after engagement of the third engagement element has been completed.

2. The control apparatus according to claim 1, wherein the input torque control means sets an amount of reduction of the input torque that starts to be reduced during engagement control of the third engagement element at the time of a speed-change operation from the first speed-change stage to the second speed-change stage smaller than an amount of reduction of the input torque that starts to be reduced during engagement control of the third engagement element at the time of a speed-change operation which is not the speed-change operation from the first speed-change stage to the second speed-change stage and in which the third engagement element is engaged.

3. The control apparatus according to claim 1, wherein the input torque control means starts to adjust the input torque when engagement of the third engagement element is about to be started.

4. The control apparatus according to claim 3, wherein the input torque control means completes adjustment of the input torque after engagement of the third engagement element has been completed.

5. The control apparatus according to claim 4, wherein adjustment of the input torque is composed of a process of maintaining a torque-down amount constant and a process of reducing the torque-down amount at a constant rate.

6. The control apparatus according to claim 1, wherein the speed-change operation from the first speed-change stage to the second speed-change stage is a power-on downshift speed-change operation that is based on depression of an accelerator pedal.

7. The control apparatus according to claim 5, wherein the speed-change operation from the first speed-change stage to the second speed-change stage is a power-on downshift speed-change operation that is based on depression of an accelerator pedal.

8. A control apparatus for an automatic transmission wherein operation of four engagement elements is required at the time of a speed-change operation from a first speed-change stage to a second speed-change stage, wherein the first speed-change is established through engagement of a first engagement element and a second engagement element, and wherein a second speed-change is established through engagement of a third engagement element and a fourth engagement element comprising:

input torque control means for starting to adjust a torque input to the automatic transmission during engagement control of the third engagement element and during engagement control of the fourth engagement element respectively, wherein the input torque control means starts to reduce the input torque during engagement control of the third engagement element and during engagement control of the fourth engagement element respectively; release of the second engagement element is started after release of the first engagement element has been started, and engagement of the fourth engagement element is completed after engagement of the third engagement element has been completed; and the input torque control means sets an amount of reduction of the input torque during engagement control of the third engagement element smaller than an amount of reduction of the input torque during engagement control of the fourth engagement element.

9. A control apparatus for an automatic transmission wherein operation of four engagement elements, namely, first to fourth engagement elements is required at the time of a speed-change operation from a first speed-change stage to a second speed-change stage, comprising:

speed-change control means for performing the speed-change operation from the first speed-change stage to the second speed-change stage by continuously performing speed-change control to a third speed-change stage in which the first and third engagement elements are released and engaged respectively and speed-change control to the second speed-change stage in which the second and fourth engagement elements are released and engaged respectively; and input torque control means for starting to adjust an input torque-down amount during the speed-change operation to the third speed-change stage so as to determine a speed-change characteristic at the time of a speed-change operation from the first speed-change stage to the second speed-change stage via the third speed-change stage.

10. The control apparatus according to claim 9, wherein the input torque control means reduces the torque-down amount at the time of the speed-change operation from the first speed-change stage to the third speed-change stage via the third speed-change stage, with respect to a torque-down amount at the time of a speed-change operation that is intended to establish the third speed-change stage.

11. The control apparatus according to claim 10, wherein the third speed-change stage is between the first and second speed-change stages, and the speed-change operation is a skip speed-change operation from the first speed-change stage to the second speed-change stage.

12. The control apparatus according to claim 10, wherein the input torque control means starts to adjust the input torque when the speed-change operation to the third speed-change stage is about to be started.

13. The control apparatus according to claim 12, wherein the input torque control means completes adjustment of the input torque after the speed-change operation to the third speed-change stage has been completed.

14. The control apparatus according to claim 9, wherein the speed-change operation from the first speed-change stage to the second speed-change stage is a power-on downshift speed-change operation that is based on depression of an accelerator pedal.

15. The control apparatus according to claim 11, wherein the speed-change operation from the first speed-change stage to the second speed-change stage is a power-on downshift speed-change operation that is based on depression of an accelerator pedal.

16. The control apparatus according to claim 13, wherein the speed-change operation from the first speed-change stage to the second speed-change stage is a power-on downshift speed-change operation that is based on depression of an accelerator pedal.

* * * * *